(12) United States Patent
Imade et al.

(10) Patent No.: US 11,568,529 B2
(45) Date of Patent: Jan. 31, 2023

(54) GAS DETECTION DEVICE THAT VISUALIZES GAS

(71) Applicant: Konica Minolta, Inc., Tokyo (JP)

(72) Inventors: Kyuichiro Imade, Tokyo (JP); Shunsuke Takamura, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/263,030

(22) PCT Filed: Apr. 12, 2019

(86) PCT No.: PCT/JP2019/015889
§ 371 (c)(1),
(2) Date: Jan. 25, 2021

(87) PCT Pub. No.: WO2020/021785
PCT Pub. Date: Jan. 30, 2020

(65) Prior Publication Data
US 2021/0312602 A1    Oct. 7, 2021

(30) Foreign Application Priority Data

Jul. 25, 2018  (JP) .............................. JP2018-139158
Aug. 20, 2018  (JP) .............................. JP2018-153951

(51) Int. Cl.
*G06F 3/0482* (2013.01)
*G06T 7/00* (2017.01)
(Continued)

(52) U.S. Cl.
CPC ............. *G06T 7/0002* (2013.01); *G01M 3/02* (2013.01); *G06F 3/0482* (2013.01);
(Continued)

(58) Field of Classification Search
CPC .................................................. G06T 7/0002
(Continued)

(56) References Cited

U.S. PATENT DOCUMENTS 9,900,524 B2 *  2/2018  Lammert ................. G01J 5/08
11,392,897 B1 *  7/2022  Gingrich ............... G06Q 10/20
(Continued)

FOREIGN PATENT DOCUMENTS

JP    2005-533997 A    11/2005
JP    2009-192469 A    8/2009
(Continued)

OTHER PUBLICATIONS

International Search Report issued in International Application No. PCT/JP2019/015889, dated Jun. 18, 2019 (5 pages).
(Continued)

*Primary Examiner* — Reza Nabi
(74) *Attorney, Agent, or Firm* — Osha Bergman Watanabe & Burton LLP

(57) ABSTRACT

A gas detection device includes: a processor that visualizes a gas by performing image processing on infrared image data in an inspection region imaged by an imaging device; a display that displays an inspection image that reflects a result of the image processing; and an input interface that receives an input of supplementary information on the inspection image displayed on the display.

11 Claims, 11 Drawing Sheets

(51) Int. Cl.
*G01M 3/02* (2006.01)
*G06F 3/04847* (2022.01)
*G06T 11/00* (2006.01)
*G06T 11/20* (2006.01)
*H04N 5/92* (2006.01)

(52) U.S. Cl.
CPC ........ *G06F 3/04847* (2013.01); *G06T 11/001* (2013.01); *G06T 11/206* (2013.01); *H04N 5/9206* (2013.01); *G06T 2200/24* (2013.01); *G06T 2207/10048* (2013.01)

(58) Field of Classification Search
USPC .......................................................... 715/833
See application file for complete search history.

(56) References Cited

U.S. PATENT DOCUMENTS

| | | | | |
|---|---|---|---|---|
| 2004/0245467 A1* | 12/2004 | Lannestedt | ............... | H04N 5/33 382/141 |
| 2010/0078561 A1* | 4/2010 | Gorin | ...................... | G06T 7/254 250/338.5 |
| 2013/0055109 A1* | 2/2013 | Takamura | ........ | H04N 21/41415 715/753 |
| 2013/0106748 A1* | 5/2013 | Hosaka | ................... | G06F 9/451 345/173 |
| 2014/0282017 A1* | 9/2014 | Kanazawa | ............... | G06F 3/013 715/733 |
| 2014/0375578 A1* | 12/2014 | Ogino | .................... | G06F 40/166 345/173 |
| 2018/0164211 A1* | 6/2018 | Kageyama | ............ | G01N 21/359 |
| 2018/0202923 A1* | 7/2018 | Kageyama | .............. | G01N 21/39 |
| 2018/0222581 A1* | 8/2018 | Nagasawa | ................ | G01M 3/38 |
| 2018/0284088 A1* | 10/2018 | Verbeck, IV | .......... | G01N 21/65 |
| 2018/0292291 A1* | 10/2018 | Tsuchiya | ................ | G01M 3/002 |
| 2019/0005978 A1* | 1/2019 | Barnett | .................... | G10L 15/08 |
| 2019/0078966 A1* | 3/2019 | Zhang | ................... | G01M 3/002 |
| 2019/0086378 A1* | 3/2019 | Holdcroft | .......... | G01N 33/0009 |
| 2019/0118174 A1* | 4/2019 | Parracino | .............. | G01N 21/171 |
| 2019/0145891 A1* | 5/2019 | Waxman | ................. | G01M 3/38 356/409 |
| 2019/0339159 A1* | 11/2019 | Israelsen | ................. | G01M 3/38 |
| 2019/0340914 A1* | 11/2019 | Israelsen | ................. | G01M 3/04 |
| 2020/0059623 A1* | 2/2020 | Hirata | ............... | H04N 5/44504 |
| 2020/0059624 A1* | 2/2020 | Hirata | .................... | G06T 7/0004 |
| 2020/0309683 A1* | 10/2020 | Imade | ...................... | G01N 1/24 |
| 2021/0003983 A1* | 1/2021 | Okamoto | ................. | G06T 7/90 |
| 2021/0076006 A1* | 3/2021 | O'Neill | .................... | G01M 3/04 |
| 2021/0279854 A1* | 9/2021 | Shiomi | .................... | H04N 7/183 |
| 2021/0312602 A1* | 10/2021 | Imade | ................... | G06T 7/0002 |
| 2021/0368140 A1* | 11/2021 | Asano | ...................... | H04N 5/33 |
| 2022/0237225 A1* | 7/2022 | Takamura | ............... | G06F 16/54 |

FOREIGN PATENT DOCUMENTS

| | | |
|---|---|---|
| JP | 2010-271094 A | 12/2010 |
| JP | 2012-058093 A | 3/2012 |
| WO | 2017/022286 A1 | 2/2017 |

OTHER PUBLICATIONS

Written Opinion issued in International Application No. PCT/JP2019/015889, dated Jun. 18, 2019 (5 pages).

Written Opinion issued in corresponding International Application No. PCT/JP2019/015889 dated Feb. 4, 2021 (10 pages).

\* cited by examiner

GAS DETECTION DEVICE THAT VISUALIZES GAS

CROSS-REFERENCE TO RELATED APPLICATIONS

The disclosures of Japanese Patent Applications No. 2018-139158, filed on Jul. 25, 2018 and No. 2018-153951, filed on Aug. 20, 2018, including the specifications, drawings and abstracts are incorporated herein by reference in their entirety.

TECHNICAL FIELD

The present invention relates to a gas detection device, a gas detection method, a display control method, and a non-transitory computer-readable recording medium storing a program.

BACKGROUND ART

A gas leakage detector that detects a gas leak in an inspection region by using characteristics of gas for absorbing infrared is conventionally known (see Patent Literature, (hereinafter, referred as "PTL") 1).

PTL 1 discloses the gas leakage detector including an infrared camera and a visible light camera imaging an image (a moving image) of an inspection region including an inspection target, an image processing section processing the infrared image data imaged by the infrared camera, and a display section. The image processing section extracts an image of fluctuation caused by a gas leak from the image data of the inspection region. The display section displays an inspection image in which the image data of fluctuation is superimposed on the image data of the inspection region imaged by the visible light camera.

PATENT LITERATURE

PTL 1: Japanese Patent Application Laid-Open No. 2012-58093

The gas detection device disclosed in PTL 1 allows an inspector to visually identify with ease a gas leak spot in an inspection region by visually recognizing the inspection image displayed on the display section.

Incidentally, in the inspection image, for example, importance of an inspection image in a normal time is different from that of an inspection image in an emergency time when an inspection target has a gas leak.

With respect to such inspection images, for example, only a specific inspection image may be needed (e.g., only the inspection image in the emergency time) while the inspection image in a predetermined time including the inspection image in the normal time and the inspection image in the emergency time may be needed. When a user can add supplementary information to the specific inspection image in the inspection image, then, the user can efficiently extract the specific inspection image from the inspection image. However, the gas detection device disclosed in NPL 1 does not have such a configuration.

SUMMARY

One or more embodiments of the present invention provide a gas detection device, a gas detection method, a display control method, and a non-transitory computer-readable recording medium storing a program capable of adding supplementary information to a specific image of inspection images.

A gas detection device according to one or more embodiments of the present invention includes: an image processing section (i.e., processor) that visualizes a gas by performing image processing on infrared image data in an inspection region imaged by an imaging section (i.e., imaging device); a display section (i.e., display) that displays an inspection image that reflects a result of the image processing; and an input section (i.e., input interface) that receives input of supplementary information related to the inspection image displayed on the display section.

A gas detection device according to one or more embodiments of the present invention includes: an image processing section that visualizes a gas by performing image processing on infrared image data in an inspection region imaged by an imaging section; a gas detection section that detects the gas based on a result of the image processing; and a display control section (i.e., controller) that performs display control to display an inspection image reflecting the result of the image processing and to display detection time information indicating a time when the gas is detected by the gas detection section.

A gas detection method according to one or more embodiments of the present invention, that is a gas detection method to be executed in a gas detection device, includes: visualizing a gas by performing image processing on infrared image data in an inspection region imaged by an imaging section; displaying an inspection image reflecting a result of the image processing on a display section; and receiving input of supplementary information related to the inspection image displayed on the display section.

A non-transitory computer-readable recording medium storing a program according to one or more embodiments of the present invention causes a computer to perform: gas visualization processing by performing image processing on infrared image data in an inspection region imaged by an imaging section; display processing of an inspection image reflecting a result of the image processing on the display section; and receiving processing of input of supplementary information related to the inspection image displayed on the display section.

According to one or more embodiments of the present invention, a gas detection device, a gas detection method, a display control method, and a non-transitory computer-readable recording medium storing a program capable of adding supplementary information to a specific image of inspection images can be provided.

DETAILED DESCRIPTION OF EMBODIMENTS

Hereinafter, embodiments of the present invention will be described in detail with reference to the accompanying drawings. However, the present invention is not limited to the configuration of the below embodiments.

Figure 1:
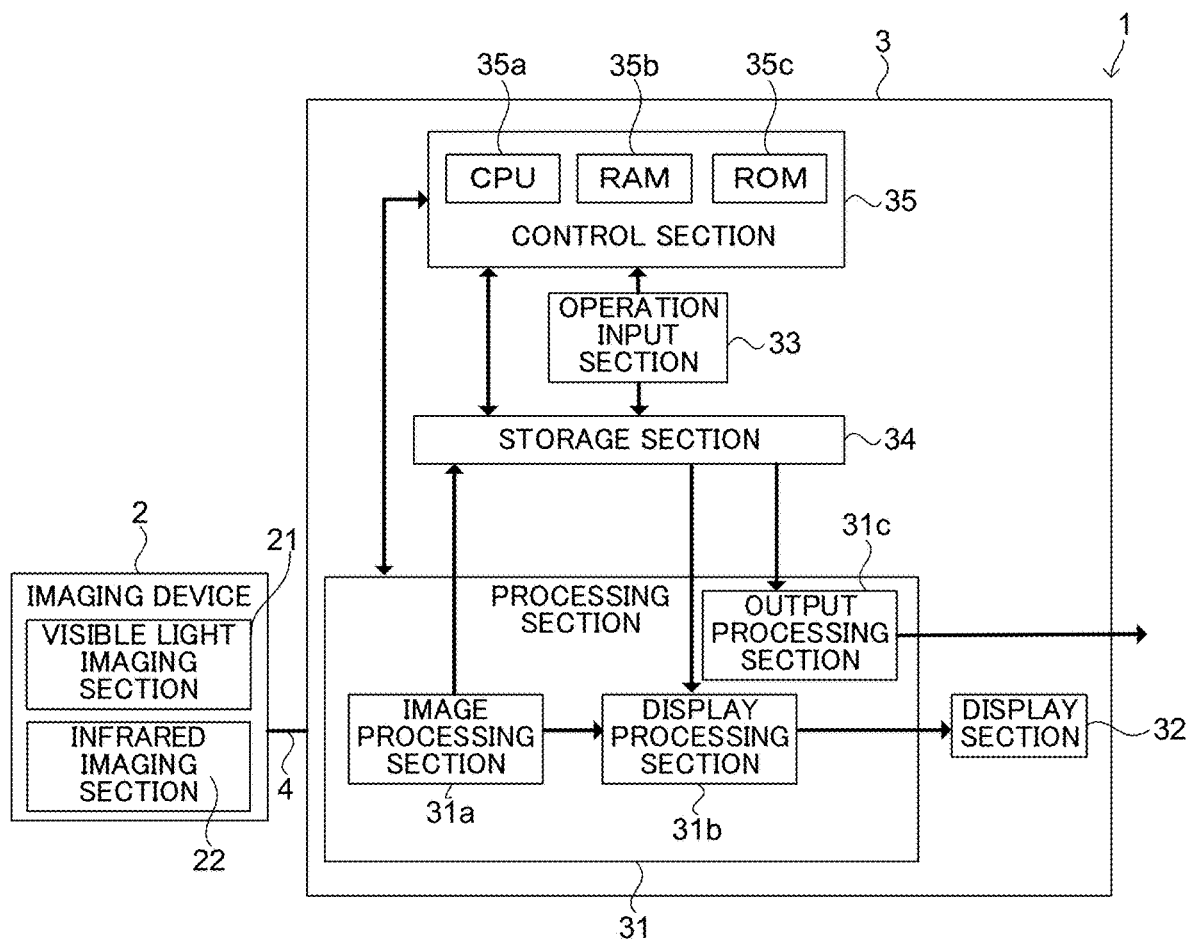
FIG. 1 is a block diagram illustrating an exemplary configuration of a gas detection device according to one or more embodiments of the present invention.

Gas detection device 1 according to one or more embodiments will be described with reference to FIGS. 1 to 7B. FIG. 1 is a block diagram of gas detection device 1. Gas detection device 1, for example, images an inspection region including an inspection target (e.g., a plant) in gas fields, and generates infrared image data of the inspection region. Then, detection device 1 generates an inspection image, in which the gas is visualized by performing image processing on the infrared image data. In addition, when using gas detection device 1 of one or more embodiments, a user can add supplementary information to the inspection image at any timing, while visually recognizing the inspection image displayed on the display section. In the following description, images include moving images as well as still images.

<Gas Detection Device>

As illustrated in FIG. 1, gas detection device 1 includes imaging device 2 and gas detection device body 3. Imaging device 2 and gas detection device body 3 are connected with each other via cable 4. Imaging device 2 may be connected to gas detection device body 3 via wireless communication. Imaging device 2 may also be connected to gas detection device body 3 via a network such as the Internet.

<Imaging Device>

Imaging device 2 is, for example, a portable camera device. Imaging device 2 may be a camera device that is fixed to a predetermined position. Imaging device 2 may be controlled by, for example, control section 35 of gas detection device body 3 to be described below, and a control section (not illustrated) or the like included in imaging device 2.

Imaging device 2 starts imaging, for example, when an instruction to start imaging (hereinafter referred to as "imaging start instruction") is input from a user through operation input section 33 of gas detection device body 3. However, even when the imaging start instruction is input, imaging device 2 does not need to start imaging in a case where no imaging information is input from a user.

In particular, imaging device 2 includes visible light imaging section 21 and infrared imaging section 22.

<Visible Light Imaging Section>

Visible light imaging section 21 includes, by way of example, a first optical system (not illustrated), a first optical filter (not illustrated), and a visible light sensor (not illustrated).

The first optical system forms an image of the visible light incident from the inspection region to be an object on the visible light sensor.

The first optical filter is, in one example, an infrared cut filter disposed on an optical path connecting between the optical system and the visible light sensor. The infrared cut filter cuts infrared light from the light which has passed through the optical system.

The visible light sensor is, for example, a CMOS image sensor, and receives black-and-white BW visible light, or color RGB visible light to generate visible image data.

Visible light imaging section 21 having this configuration images, for example, an image of the inspection region including the inspection target (e.g., plant 6a illustrated in FIG. 5A) in gas fields, and sequentially outputs visible image data to processing section 31 (specifically, image processing section 31a).

The visible image data generated by visible light imaging section 21 is a still image or a moving image. Note that, visible light imaging section 21 may be omitted when inspection image 7 displayed on display section 32 described below (see FIG. 5A) is infrared image data to be described later.

<Infrared Imaging Section>

Infrared imaging section 22 includes, by way of example, a second optical system (not illustrated), a second optical filter (not illustrated), and an infrared sensor (not illustrated).

The second optical system forms an image of the infrared light incident from the inspection region to be an object on the infrared sensor.

The second optical filter is, in one example, a bandpass filter disposed on an optical path connecting between the second optical system and the infrared sensor. The second optical filter transmits only infrared light included in a predetermined wavelength band in the infrared light that has passed through the optical system. The pass wavelength band of the second optical filter is substantially set to an absorption wavelength band of a gas to be detected. For example, when the pass wavelength band is set to a middle wavelength range of 3.2 to 3.4 μm, a methane gas or the like can be detected.

The infrared sensor is, for example, a quantum indium antimonide (INSb) image sensor, a heat-type thermopile array sensor, or a microbolometer, and receives infrared light to generate infrared image data. Infrared imaging section 22 having such a configuration images an image of the inspection region in a state of being synchronized with visible light imaging section 21 and sequentially outputs infrared image data to processing section 31 (specifically, image processing section 31a).

The infrared image data generated by infrared imaging section 22 is a still image or a moving image. Such infrared image data indicates a temperature distribution in the inspection region.

<Gas Detection Device Body>

Gas detection device body 3 converts a gas generated in the inspection region into a visible image by using received information from imaging device 2. Gas detection device body 3 having this configuration is a mobile terminal such as a tablet terminal, a smartphone, a laptop terminal, or a wearable terminal, which is communicably connected to imaging device 2.

Gas detection device body 3 includes, for example, processing section 31, display section 32, operation input section 33, storage section 34, and control section 35.

<Processing Section>

Processing section 31 (i.e., processor) comprises at least one dedicated hardware (an electronic circuit) in accordance with various kinds of each processing, such as a Digital Signal Processor (DSP), an Application Specific Integrated Circuit (ASIC), or a Programmable Logic Device (PLD). Processing section 31 includes, as functional blocks, image processing section 31a, display processing section 31b, and output processing section 31c. Each function of processing section 31 to be described below is realized under the control of control section 35.

<Image Processing Section>

A function of image processing section 31a will be described below. The function of image processing section 31a is realized under the control of control section 35.

Image processing section 31a receives infrared image data (hereinafter referred to as "infrared image data before image processing") in the inspection region from infrared imaging section 22. Image processing section 31a detects a part having a gas by performing a predetermined image processing on the infrared image data in the inspection region and visualizes the detected part (hereinafter referred to as "gas visualization processing"). Image processing section 31a applies a specific color (red or the like) to the part having a gas of the infrared image data before image processing. The infrared image data obtained after gas visualization processing is referred to as "infrared image data after image processing".

A method for detecting a gas from infrared image data in the inspection region will be briefly described. When a gas leak has occurred in the inspection region, a temperature of the part having a gas of infrared image data in the inspection region changes (i.e., luminance of infrared image data in the inspection region changes). Image processing section 31a detects the part having a gas based on the change in temperature. Since a method for detecting a gas is a well-known image processing method, it will not be described in detail.

Furthermore, image processing section 31a receives visible image data from (hereinafter referred to as "visible image data before image processing") visible light imaging section 21. Image processing section 31a, then, generates inspection image data, in which the visible image data before image processing and the infrared image data after image processing are combined. Inspection image data is displayed on the display section as inspection image 7 (see FIG. 5A). Gas image 7a (see FIG. 5A) illustrating the gas in inspection image 7 is colored in the specific color. Note that, the infrared image data after image processing described above can be infrared image data without combining the visible image data.

Image processing section 31a outputs inspection image data to display processing section 31b.

Image processing section 31a outputs inspection image data to storage section 34. Image processing section 31a may outputs the infrared image data after image processing to storage section 34. In addition, image processing section 31a may output the visible image data before image processing to storage section 34.

<Display Processing Section>

Hereinafter, a function of display processing section 31b will be described. The function of display processing section 31b is realized under the control of control section 35. Display processing section 31b having such a configuration controls display of display section 32 to be described below.

Display processing section 31b displays an imaging information input image (not illustrated) for inputting imaging information on display section 32. Image data to be the basis of the imaging information input image is prestored in storage section 34.

Display processing section 31b converts the inspection image data received from image processing section 31a into a display signal corresponding to display section 32, and outputs the display signal to display inspection image 7 (see FIG. 5A) on display section 32.

Display processing section 31b displays supplementary information input image 5 (see FIG. 5A) for inputting supplementary information with inspection image 7 on display section 32.

Figure 5A:
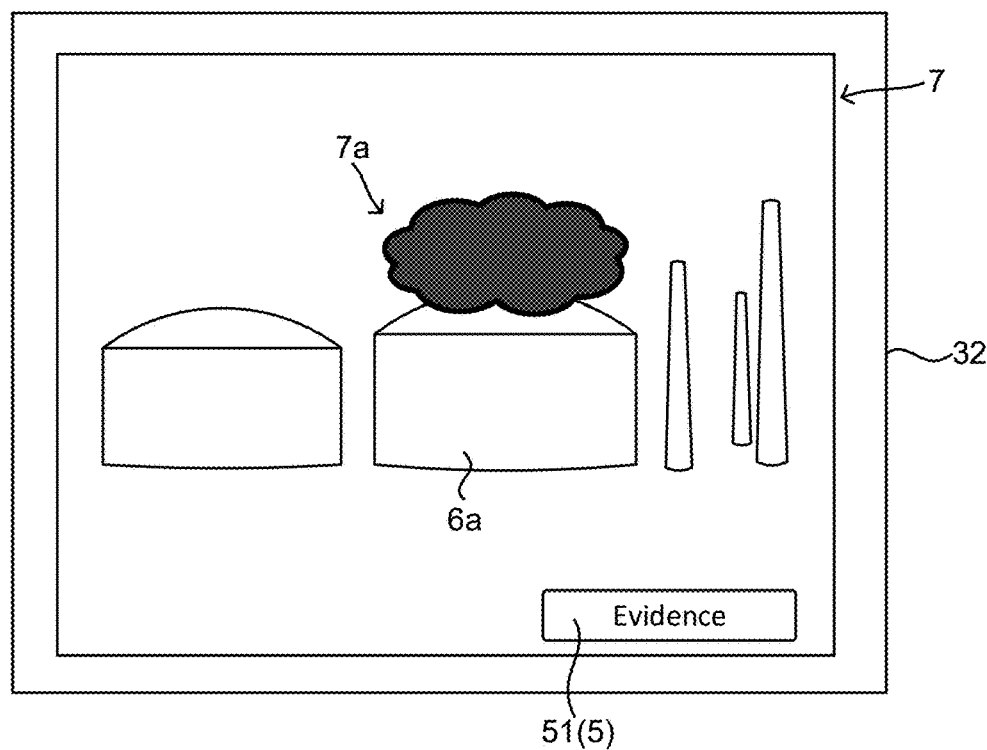
FIG. 5A illustrates an exemplary inspection image displayed on a display section during imaging.

FIG. 5A illustrates examples of inspection image 7 and supplementary information input image 5 displayed on display section 32. Supplementary information input image 5 is, for example, an icon. Image data to be the basis of supplementary information input image 5 is prestored in storage section 34. Supplementary information input image 5 may be comprised of a plurality of images to be sequentially pop-up displayed corresponding to touch operations by a user.

In one or more embodiments, supplementary information input image 5 is comprised of first input image 51 (see FIG. 5A) always displayed on display section 32 with inspection image 7, and second input image 52 (see FIG. 5B) displayed on display section 32 when the user operates (e.g., by touch operation) first input image 51.

Display processing section 31b displays second input image 52 on display section 32 when first input image 51 is operated by the user. In a case where an end instruction is input via operation input section 33 while second input image 52 displayed on display section 32, display processing section 31b deletes second input image 52 from display section 32. Display processing section 31b may delete second input image 52 after a predetermined time passes. That is, the pop-up displayed screen as second input image 52 may be automatically deleted after a predetermined time passes from the start of display.

When an instruction for reproduction start (hereinafter referred to as "reproduction start instruction") is input via operation input section 33, display processing section 31b converts the inspection image data stored in storage section 34 into a display signal corresponding to display section 32, and outputs the display signal to display inspection image 7 on display section 32. In this case, display processing section 31b displays supplementary information input image 5 with inspection image 7 on display section 32.

Display processing section 31b displays seek bar image 53 (see FIGS. 7A and 7B) on display section 32 when the reproduction start instruction is input. Image data to be the basis of seek bar image 53 is prestored in storage section 34. Seek bar image 53 enables the user to recognize a reproduction status. In addition, the user can adjust a reproduction start position by operating seek bar image 53.

Figure 7A:
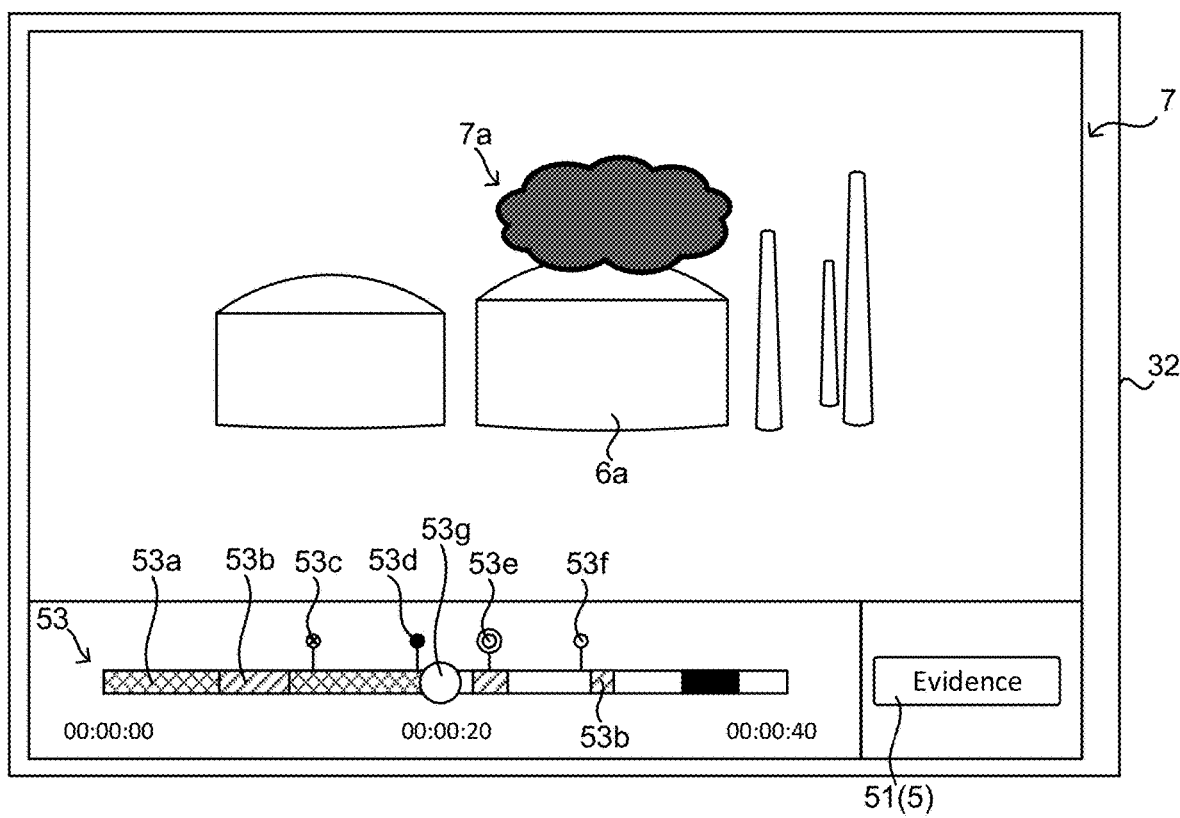
FIG. 7A illustrates an exemplary inspection image displayed on a display section during reproduction.
Figure 7B:
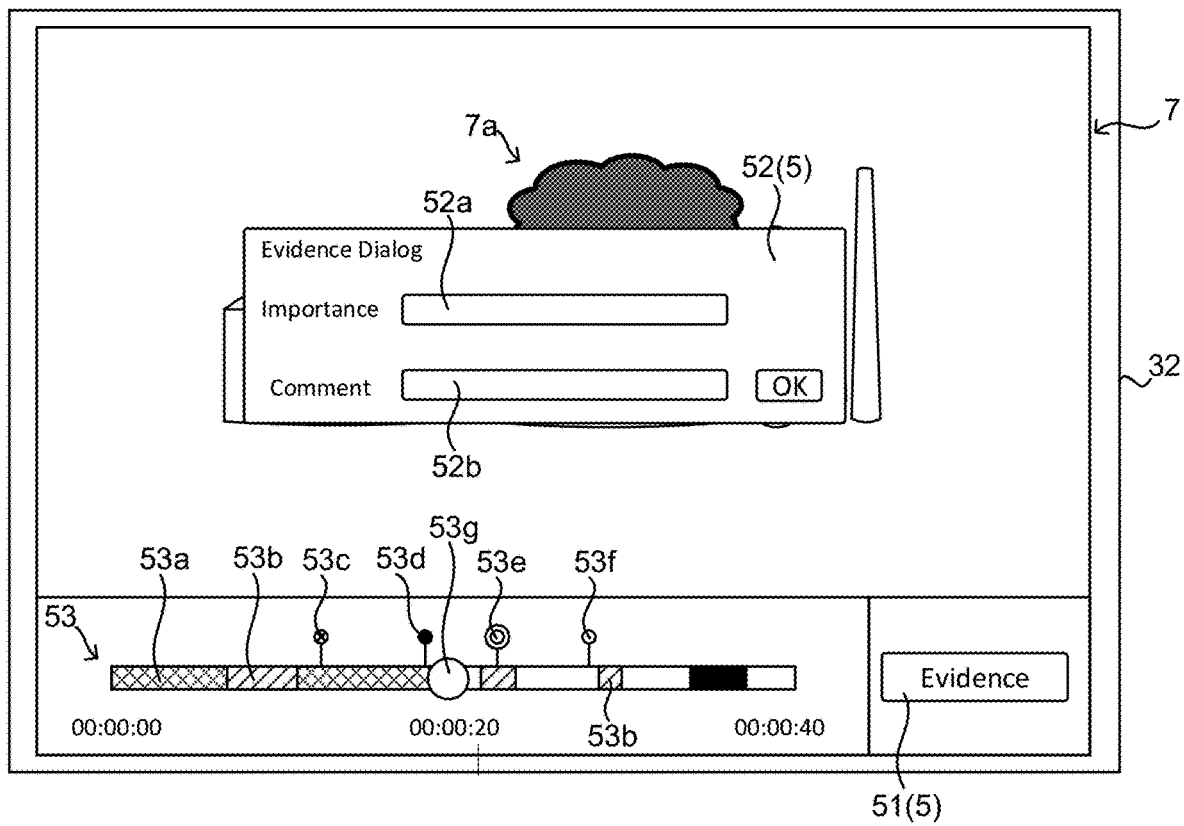
FIG. 7B illustrates an exemplary inspection image on the display section being changed from the state illustrated in FIG. 7A.

Seek bar image 53 will be described with reference to FIG. 7A. First bar elements 53a (parts having slanted lattice)

each mean the part being already reproduced in inspection image data. Furthermore, in seek bar image 53, second bar elements 53b (hatched parts) each mean the part where a gas leak has been mechanically detected based on the detection result of image processing section 31a.

In seek bar image 53, first mark 53c means the part that has been checked by the user. In seek bar image 53, second mark 53d means the unnecessary image data. Furthermore, in seek bar image 53, third mark 53e and fourth mark 53f mean the parts to which supplementary information is added by the user. Between these, third mark 53e means the nearest supplementary information (evidence) from reproducing position mark 53g indicating the position under reproduction. Besides, in seek bar image 53, white painted parts mean the unreproduced parts. Additionally, in seek bar image 53, black painted parts mean the deleted parts.

<Output Processing Section>

Output processing section 31c generates output information including the imaging information and the inspection image data under the control of control section 35. Output processing section 31c generates output information when an output instruction is input from operation input section 33.

When a range of the inspection image data is input from operation input section 33, output processing section 31c extracts the inspection image data of the range, and generates information as output information. Note that, output information may include inspection image data associated with supplementary information.

Output processing section 31c outputs the output information to, for example, an output device such as printer. The output device may be connected to detection device body 3 by a wired or wireless connection. The output device also may be connected to detection device body 3 via a network such as the Internet. Output processing section 31c may output the output information to a portable storage medium, such as an optical disk, a magneto-optical disk, or a memory card.

Note that, when gas detection device 1 is connected to a server via a network, output processing section 31c may output the output information to the server.

<Display Section>

Display section 32 is, for example, a display of a mobile terminal constituting gas detection device body 3. As the display, a liquid crystal display, an organic EL display, or the like can be used. In one or more embodiments, the display is a flat panel display having a touch panel.

Display section 32 displays various images based on the display signals from display processing section 31b under the control of control section 35. On display section 32, inspection image 7 for the user to visually detect a gas, supplementary information input image 5 for the user to input the supplementary information, and seek bar image 53 for the user to recognize a reproduction status of the inspection image data and/or the like are displayed (see FIGS. 5A to 7A).

<Operation Input Section>

Operation input section 33 (i.e., input interface) is an input section that receives, for example, input of imaging information and input of supplementary information. Operation input section 33 also receives an operation relating to reproduction of the inspection image data and an operation relating to imaging of imaging device 2. Note that, imaging information includes various pieces of information required to start imaging by imaging device 2. Imaging information will be described below.

Operation input section 33 receives an output instruction. Operation input section 33 may receive, for example, designation of items to be included in the output information, together with the output instruction. The items of the output information include imaging information described below and any other information (e.g., weather information during imaging).

Operation input section 33 may receive designation of a range of the inspection image data to be output as output information. The user, by way of example, designates the range of the inspection image data to be output from seek bar image 53 (see FIG. 7A) displayed on display section 32.

Operation input section 33 may permit receiving input of the output instruction only when imaging information corresponding to the inspection region to be imaged is input (i.e., when the imaging information is stored in storage section 34).

Conversely, operation input section 33 may reject receiving input of the output instruction when imaging information corresponding to the inspection region to be imaged is not input (i.e., when the imaging information is not stored in storage section 34).

Furthermore, operation input section 33 may permit receiving input of the output instruction only when supplementary information associated with the inspection image data is input (i.e., when the supplementary information is stored in storage section 34).

Conversely, operation input section 33 may reject receiving input of the output instruction when supplementary information associated with the inspection image data is not input (i.e., when the supplementary information is not stored in storage section 34).

In other words, operation input section 33 may permit receiving input of the output instruction only when the imaging information corresponding to the inspection region to be imaged and the supplementary information associated with the inspection image data are input.

In one or more embodiments, operation input section 33 comprises a flat panel display with a touch panel that is integrally provided with display section 32. The user can input imaging information, input supplementary information, operate imaging device 2, and perform reproducing operations of the inspection image data via operation input section 33.

Operation input section 33 is not limited to a flat display with a touch panel, and may be, for example, an input device such as a keyboard, a mouse, or a microphone instead.

<Control Section>

Control section 35 (i.e., controller) includes Central Processing Unit (CPU) 35a as a calculation/control device, Random Access Memory (RAM) 35b and Read Only Memory (ROM) 35c as a main storage device. ROM 35c stores basic programs and basic setting data. CPU 35a reads out programs corresponding to processing contents from ROM 35c or storage section 34, loads the programs into RAM 35b, and performs centralized control of operations of the respective blocks of gas detection device 1 by executing the loaded programs. Control section 35 having such a configuration controls imaging device 2, display section 32, operation input section 33, and storage section 34 depending on their functions and thereby controls the entire gas detection device 1.

In one or more embodiments, functions of each functional block can be realized by the cooperation of each hardware constituting the functional blocks and control section 35.

Note that, a part or all of the functions of each functional block may be realized by execution of the programs by control section 35.

<Storage Section>

Storage section 34 (i.e., storage) is, for example, an auxiliary storage device such as a nonvolatile semiconductor memory (a so-called flash memory) or a hard disk drive. Storage section 34 may be a disk drive for reading and writing information by driving an optical disk such as a Compact Disc (CD) or a Digital Versatile Disc (DVD), or a Magneto-Optical Disk (MO). In addition, for example, storage section 34 may be a memory card such as a USB memory or an SD card.

Storage section 34 stores the imaging information input from operation input section 33. Writing of data into storage section 34 and reading of data from storage section 34 are controlled by control section 35.

Storage section 34 stores the inspection image data received from image processing section 31a. Storage section 34 stores the inspection image data in association with the imaging information.

Storage section 34 may store the infrared image data after image processing received from image processing section 31a. Storage section 34 may store the infrared image data in association with the imaging information.

Storage section 34 may store the infrared image data before image processing generated by infrared imaging section 22. Storage section 34 may store the infrared image data before image processing in association with the imaging information.

Storage section 34 may store the visible image data generated by visible light imaging section 21. Storage section 34 may store the visible image data in association with the imaging information.

Storage section 34 stores various pieces of information input from operation input section 33. In particular, storage section 34 stores the supplementary information input from operation input section 33. Storage section 34 stores the supplementary information in association with inspection image 7 (see FIG. 5A) displayed on display section 32 when the supplementary information is input. When inspection image 7 is a moving image, storage section 34 stores the supplementary information in association with a frame constituting inspection image 7 (see FIG. 5A) displayed on display section 32 when the supplementary information is input.

Storage section 34 stores image data relating to supplementary information input image 5. Storage section 34 also stores image data relating to seek bar image 53. The image data relating to seek bar image 53 include image data relating to first bar element 53a, second bar element 53b, and first mark 53c to fourth mark 53f described above.

<Exemplary Operation>

Figure 2:
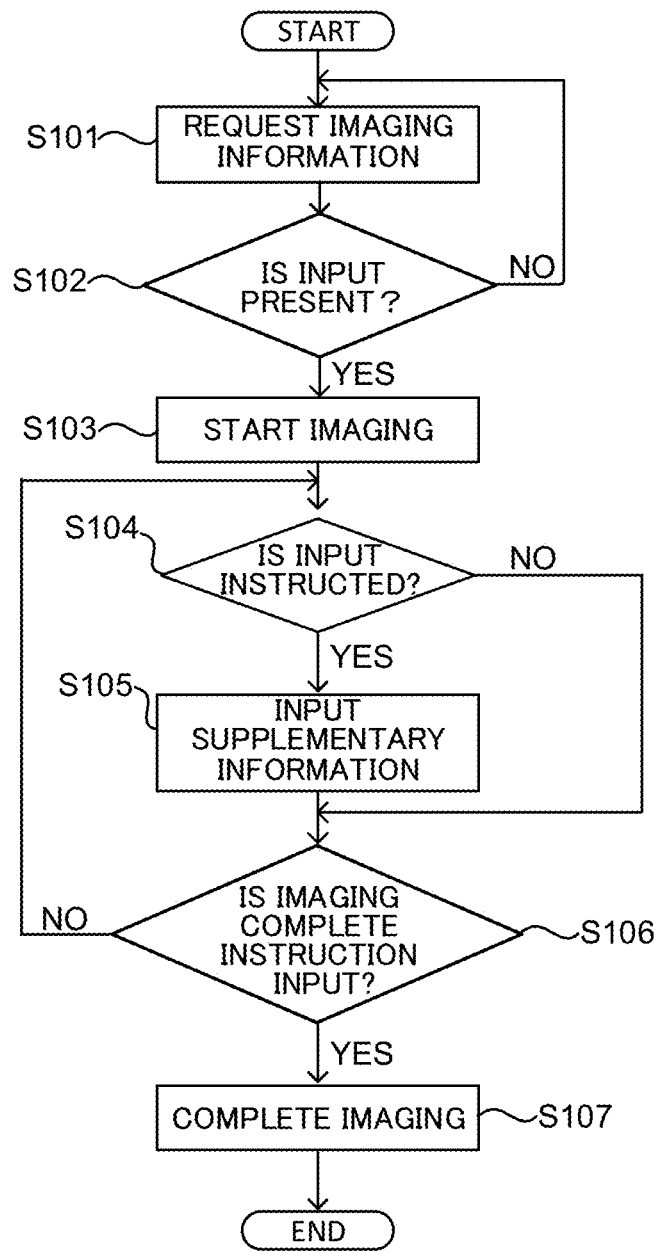
FIG. 2 is a flowchart of flow for inputting supplementary information during imaging.
Figure 3:
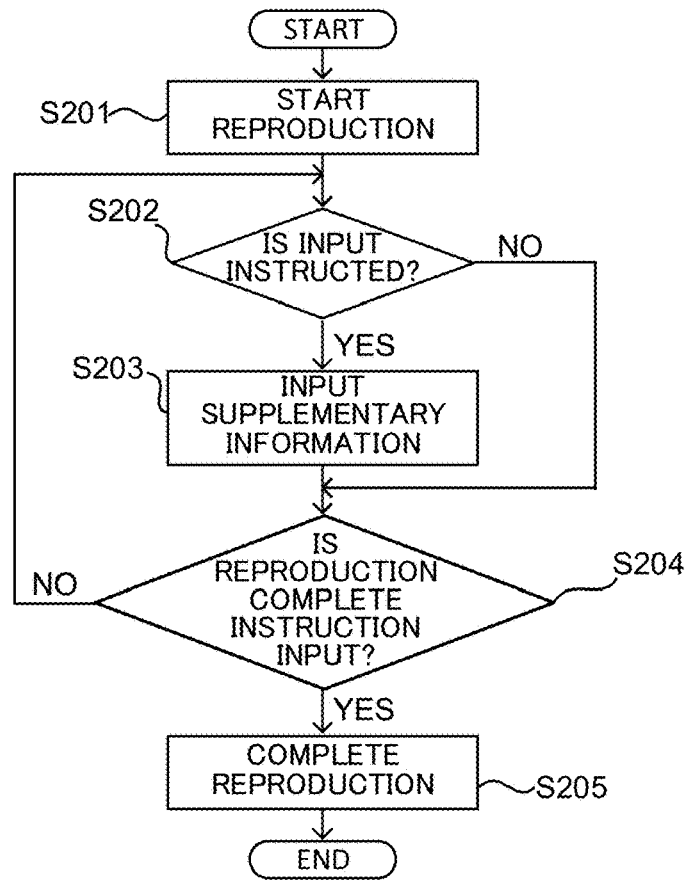
FIG. 3 is a flowchart of flow for inputting supplementary information during reproduction.
Figure 4:
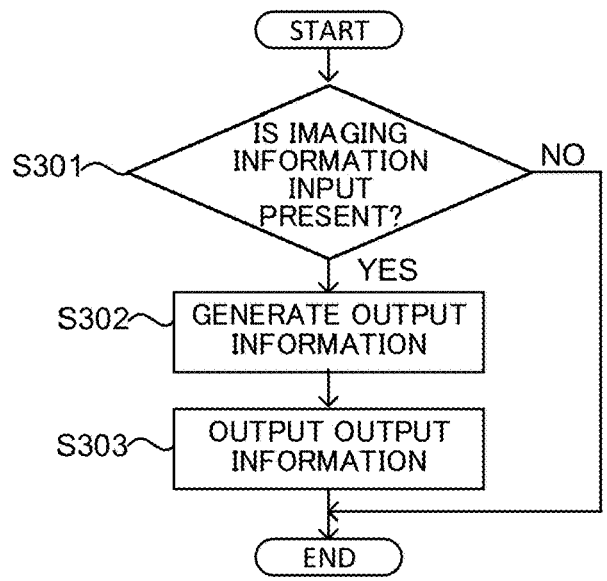
FIG. 4 is a flowchart of flow for generating and outputting output information.

Next, an exemplary operation of gas detection device 1 according to one or more embodiments of the present invention will be described with reference to FIGS. 2 to 4. FIG. 2 is a flowchart illustrating an exemplary imaging flow of gas detection device 1. FIG. 3 is a flowchart illustrating an exemplary reproduction flow of gas detection device 1. FIG. 4 is a flowchart illustrating an exemplary output flow of gas detection device 1.

<Imaging Flow>

An operation of gas detection device 1 when the user inputs the supplementary information at any timing during imaging by gas detection device 1 will be described with reference to FIGS. 1, 2, 5A, and 5B. Imaging by gas detection device 1 is performed while gas detection device 1 is placed in a predetermined position from where the inspection region including the inspection target can be imaged. Gas detection device 1 is placed in, for example, a predetermined position in a supported state by a tripod.

When an imaging start instruction is input from operation input section 33, gas detection device 1 starts the imaging flow illustrated in FIG. 2. The processing described below realized, for example, by CPU 35a executing a predetermined program stored in ROM 35c (see FIG. 1) after the imaging start instruction is input in gas detection device 1.

In step S101 in FIG. 2, display processing section 31b displays an imaging information input image (not illustrated) for inputting imaging information on display section 32 under the control of control section 35. In other words, in step S101 in FIG. 2, gas detection device 1 requests the user to input imaging information.

In step S101 in FIG. 2, imaging information requested to the user by gas detection device 1 is, in one example, the information illustrated in table 1.

TABLE 1

| | |
|---|---|
| User Info | Customer ID |
| | User ID |
| | Inspector(Name) |
| | Inspector(Company/Dept) |
| Inspection Info | Inspection Date |
| | Inspection Type |
| Site Info | Site Name |
| Facility Info | Facility Name |
| | AIRS ID |
| | GPS(Latitude, Longitude) of the Facility |

In step S101 in FIG. 2, in a case where an inspection region to be imaged has been imaged in the past, control section 35 may obtain the imaging information from imaging history. The imaging history is stored in storage section 34. Such imaging information is stored in association with the inspection region in storage section 34.

In step S102 in FIG. 2, control section 35 determines the presence or absence of input of imaging information (including the imaging information from the imaging history).

In step S102, when it is determined that no imaging information is input ("NO" in step S102), control processing shifts to step S101. By contrast, in step S102, when it is determined that imaging information is input ("YES" in step S102), control processing shifts to step S103. Note that, the determination in step S102 may be omitted as a modified example of the flowchart illustrated in FIG. 2. That is, the control processing may shift to step S103 regardless of whether the imaging information is input in step S101.

In step S103 in FIG. 2, imaging device 2 starts imaging of the inspection region under the control of control section 35. Imaging device 2 sequentially outputs visible image data to processing section 31 (specifically image processing section 31a) during imaging. In addition, imaging device 2 sequentially outputs infrared image data to processing section 31 (specifically image processing section 31a) during imaging. The visible image data and the infrared image data generated by imaging device 2 may be stored in storage section 34.

During imaging by imaging device 2, image processing section 31a receives infrared image data from infrared imaging section 22. Then, image processing section 31a performs the gas visualization processing described above on the received infrared image data to generate infrared image data after image processing.

During imaging by imaging device 2, image processing section 31a receives visible image data from visible light imaging section 21. Then, image processing section 31a generates inspection image data in which the received visible image data is combined with the infrared image data after image processing.

Image processing section 31a sequentially outputs the generated inspection image data to display processing section 31b during imaging by imaging device 2. Display processing section 31b converts the received inspection image data into a display signal corresponding to display section 32, and outputs the display signal to display inspection image 7 (see FIG. 5A) on display section 32. Thus, during imaging by imaging device 2, inspection image 7 of the inspection image is displayed in real time on display section 32.

Note that, when gas detection device 1 is connected to a server via a network, display processing section 31c may transmit inspection image 7 to the server. Inspection image 7 received in the server may be displayed on a display section (e.g., a display) connected to the server (including a connection via a network). Such a configuration allows a person other than a person who took the image to visually recognize inspection image 7 of the inspection region from a remote place in real time. Gas detection device 1 may also be configured so that the other person can input the supplementary information described below from the remote place.

In addition, display processing section 31b always displays supplementary information input image 5 (particularly first input image 51) for inputting supplementary information on display section 32 during imaging by imaging device 2.

In step S104 in FIG. 2, control section 35 determines the presence or absence of an input instruction of supplementary information. The presence or absence of an input instruction is determined, for example, whether first input image 51 is touch-operated by the user.

In step S104, when it is determined that no input of supplementary information is instructed ("NO" in step S104), control processing shifts to step S106. By contrast, in step S104, when it is determined that input of supplementary information is instructed ("YES" in step S104), control processing shifts to step S105.

In step S105 in FIG. 2, display processing section 31b displays second input image 52 on display section 32 (see FIG. 5B) under the control of control section 35. The user, in step S105, inputs the supplementary information from second input image 52 displayed on display section 32. Specifically, the user, in step S105, inputs the displayed supplementary information related to inspection image 7 from second input image 52 while inspection image 7 is displayed on display section 32. The processing of gas detection device 1 in step S105 may be referred to as supplementary information input processing.

Figure 5B:
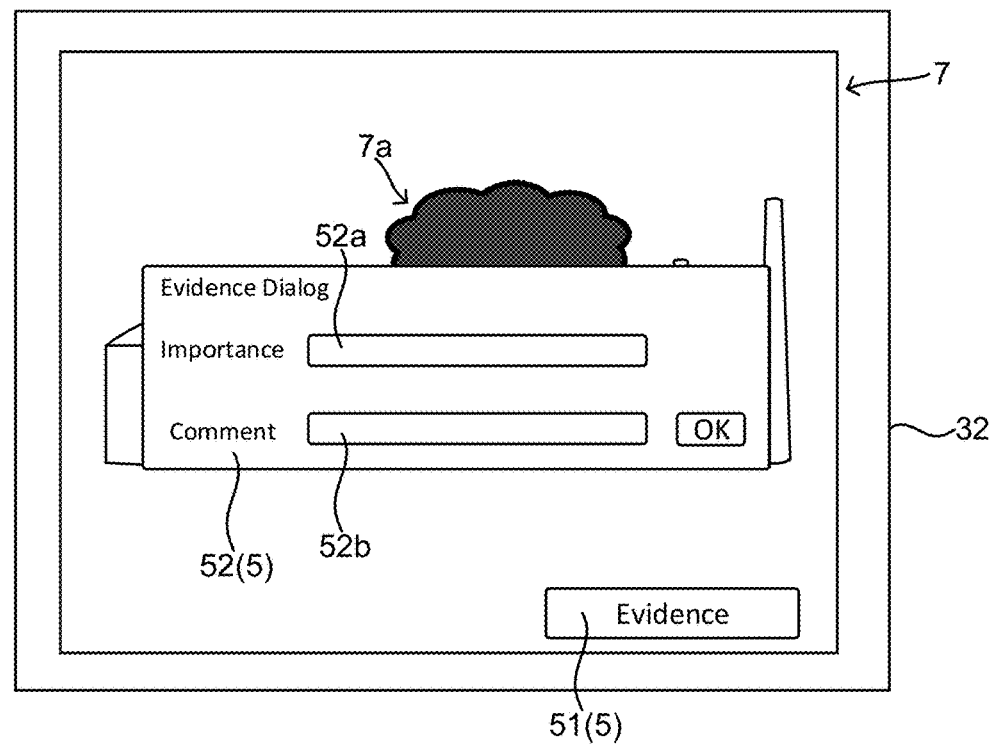
FIG. 5B illustrates an exemplary inspection image on the display section being changed from the state illustrated in FIG. 5A.

FIG. 5B illustrates a screen of display section 32 on which second input image 52 is displayed. Second input image 52 includes importance input section 52a and comment input section 52b. The user can optionally input information related to importance of inspection image 7 displayed on display section 32 to importance input section 52a. The information related to importance includes, for example, the terms "important", "normal", or "unnecessary".

Furthermore, the user can input any comment related to inspection image 7 displayed on display section 32 to comment input section 52b. The comment includes, for example, a comment related to a gas leak, such as "Gas leak is occurring". The information related to importance and the comment as described above are supplementary information.

Figure 6A:
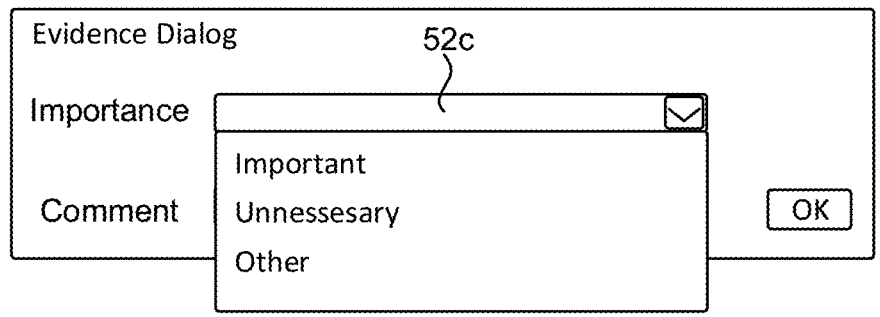
FIG. 6A illustrates a modified example 1 of a second input screen.

Note that, importance input section 52a may be an input section having a multiple-choice system, such as importance input section 52c illustrated in FIG. 6A. In addition, importance input section 52b may be an input section having a multiple-choice system, such as importance input section 52d illustrated in FIG. 6B.

Figure 6B:
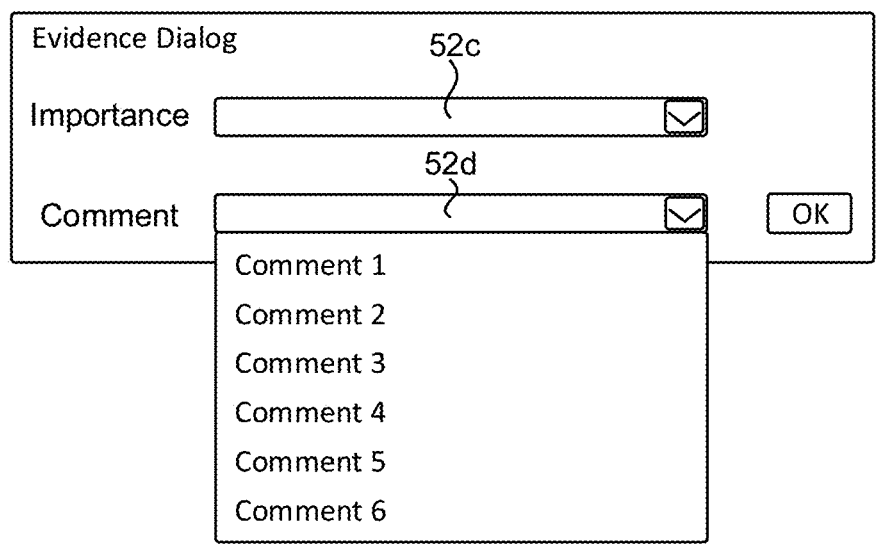
FIG. 6B illustrates a modified example 1 of the second input screen in different states from FIG. 6A.

In importance input section 52d illustrated in FIG. 6B, display processing section 31b obtains options of the comment (also referred to as "supplementary information candidates") from storage section 34, and displays on comment input section 52b of display section 32. The option of the comment may be, for example, information related to gas leak status information or regulation, which is prestored in storage section 34.

The option of the comment may also be, for example, the comment that has been input in the past by the user. Furthermore, the option of the comment may change depending on inspection image 7 displayed on display section 32. By way of example, the option of the comment may be determined based on the learning result that has been obtained by Artificial Intelligence (AI) learning the relationship between the comment that has been input in the past by the user and inspection image 7 having the comment.

In step S105, when the supplementary information is input, control section 35 stores in the storage section 34 the inspection image data that has been displayed on display section 32 (specifically, the frame constituting inspection image) in association with the supplementary information. The inspection image data to be associated with the supplementary information is the inspection image data displayed on display section 32 while second input image 52 is displayed on display section 32.

The inspection image data to be associated with the supplementary information may only be the inspection image data displayed on display section 32 at the timing when second input image 52 is displayed on display section 32 (the timing when first input image 51 on display section 32 illustrated in FIG. 5A is operated).

Note that, in supplementary information input processing in step S105, the range of the inspection image data to be associated with the supplementary information may be designated by a selecting operation by the user.

In step S106 in FIG. 2, control section 35 determines the presence or absence of an imaging completion instruction. The imaging completion instruction is input from operation input section 33 by the user.

In step S106, when it is determined that no instruction to end imaging is input ("NO" in step S106), control processing shifts to step S104. By contrast, in step S106, when it is determined that an instruction to end imaging is input ("YES" in step S106), control processing shifts to step S107.

In step S107, control section 35 ends imaging by imaging device 2. Thus, the control processing ends.

<Reproduction Flow>

An operation of gas detection device 1 when the user inputs the supplementary information at any timing during reproduction of the inspection image data stored in storage section 34 will be described with reference to FIGS. 1, 3, 7A, and 7B.

When a reproduction start instruction is input from operation input section 33, gas detection device 1 starts the reproduction flow illustrated in FIG. 3. The processing described below is realized, for example, by CPU35a executing a predetermined program stored in ROM 35c after the reproduction start instruction is input in gas detection device 1.

In step S201 in FIG. 3, display processing section 31b obtains inspection image data from storage section 34 under the control of control section 35. Display processing section 31b converts the obtained inspection image data into a display signal corresponding to display section 32, and outputs the display signal to display inspection image 7 on display section 32. Thus, the inspection image data stored in storage section 34 is displayed on display section 32.

Display processing section 31b always displays supplementary information input image 5 (particularly first input image 51) for inputting supplementary information on display section 32 (see FIG. 7A) during reproduction of the inspection image data.

Further, display processing section 31b always displays seek bar image 53 (see FIG. 7A) on display section 32 during reproduction of the inspection image data.

In step S202 in FIG. 3, control section 35 determines the presence or absence of an input instruction of supplementary information. The presence or absence of an input instruction is determined, for example, whether first input image 51 is touch-operated by the user.

In step S202, when it is determined that no input of supplementary information is instructed ("NO" in step S202), control processing shifts to step S204. By contrast, in step S202, when it is determined that input of supplementary information is instructed ("YES" in step S202), control processing shifts to step S203.

In step S203 in FIG. 3, display processing section 31b displays second input image 52 on display section 32 (see FIG. 7B) under the control of control section 35. The user, in step S203, inputs the supplementary information from second input image 52 displayed on display section 32. Specifically, the user, in step S203, inputs the reproducing displayed supplementary information related to inspection image 7 from second input image 52 while inspection image 7 is reproducing displayed on display section 32. The processing of gas detection device 1 in step S203 may be referred to as supplementary information input processing. Since the supplementary information input processing is the same as the above imaging flow, a description thereof is omitted.

In step S203, when the supplementary information is input, control section 35 stores in storage section 34 the inspection image data that has been displayed on display section 32 (specifically, the frame constituting inspection image) in association with the supplementary information. The inspection image data to be associated with the supplementary information is the inspection image data displayed on display section 32 while second input image 52 is displayed on display section 32.

In addition, when the supplementary information is input, display processing section 31b controls display section 32 so as to additionally display third mark 53e indicating the position where the supplementary information is added in the inspection image data on seek bar image 53.

Note that, during reproduction of the inspection image data, display processing section 31b may display a content of the supplementary information on display section 32 when the reproducing position in seek bar image 53 (i.e., reproducing position mark 53g) and the position of the supplementary information that has been input (e.g., third mark 53e) approach to a predetermined range.

Furthermore, display processing section 31b controls display section 32 so as to end displaying the content of supplementary information when the reproducing position in seek bar image 53 (i.e., the positon of reproducing position mark 53g in seek bar image 53) separates by a predetermined distance from third mark 53e.

In step S204 in FIG. 3, control section 35 determines the presence or absence of a reproduction completion instruction. The reproduction completion instruction is input from operation input section 33 by the user.

In step S204, when it is determined that no instruction to end reproduction is input ("NO" in step S204), control processing shifts to step S202. By contrast, in step S204, when it is determined that an instruction to end reproduction is input ("YES" in step S204), control processing shifts to step S205.

In step S205, control section 35 ends reproduction. Thus, the control processing ends.

<Output Flow>

An operation of gas detection device 1 when generating output information and outputting the output information will be described with reference to FIG. 4.

When an output instruction is input from operation input section 33, gas detection device 1 starts the output flow illustrated in FIG. 4. The processing described below is realized, for example, by CPU 35a executing a predetermined program stored in ROM 35c after the output instruction is input in gas detection device 1.

In step S301 in FIG. 4, control section 35 determines the presence or absence of imaging information.

In step S301, when it is determined that no imaging information is input ("NO" in step S301), the control processing ends. That is, gas detection device 1 prohibits generating output information in a case where no imaging information is input even when an output instruction has been input.

By contrast, in step S301, when it is determined that imaging information is input ("YES" in step S301), control processing shifts to step S302.

In step S302 in FIG. 4, output processing section 31c generates output information including the imaging information and the inspection image data under the control of control section 35. Note that, the output information may include information other than the imaging information and the image data. The user can designate information included in the output information via operation control section 33.

In step S302, output processing section 31c may generate output information by extracting the inspection image data associated with the supplementary information from the inspection image data. In other words, the output information may include the inspection image data associated with the supplementary information in the inspection image data.

In step S302, the user may designate a range of the inspection image data to be extracted as output information from operation input section 33. In this case, the output information includes the inspection image data corresponding to the range in the inspection image data.

Note that, the imaging information that is included in the output information generated in step S302 may include at least, for example, the items listed in the above Table 1.

In step S303 in FIG. 4, output processing section 31c outputs the output information to the output terminal (e.g., a printer) designated by the user or the storage medium (portable storage medium such as an optical disk, a magneto-optical disk, or a memory card) under the control of control section 35. Output processing section 31c may automatically attach the output information to a certificate (a certificate file) related to the inspection target. The control processing of output flow then ends.

Functions and Effects

Using gas detection device 1 according to the embodiments described above, the user can input any supplementary information at any timing, while visually recognizing inspection image 7 displayed on display section 32 during imaging and reproduction by gas detection device 1. Such supplementary information is stored in storage section 34 in association with inspection image 7 displayed on display section 32 when the supplementary information is input. The user can distinguish between an important part and an unimportant part in inspection image 7 by adding the supplementary information. In addition, the user can distinguish between an important part and an unimportant part in inspection image 7 by giving a meaning to inspection image 7 using the supplementary information. As a result, for example, data volume can be reduced by deleting the unimportant part from the inspection image data when inspection image 7 is stored. Furthermore, when the user checks inspection image 7 later, efficiency of checking operation can be improved by mainly checking the part having the supplementary information in inspection image 7. Moreover, when the output information is generated to output, data volume of the output information can be reduced, and efficiency of checking operation of the output information can be improved by extracting, as the output information, the inspection image data to which the supplementary information has been added.

Other Embodiments

Next, gas detection device 1 according to one or more embodiments of the present invention will be described with reference to the drawings. Gas leakage detector 1 disclosed in PTL 1 allows an inspector to visually identify with ease a gas leak spot in an inspection region by visually recognizing an inspection image displayed on a display section. Incidentally, for the inspector, the importance of an inspection image in a normal time when an inspection target has no gas leak is significantly different from that of an inspection image in an emergency time when an inspection target has a gas leak. By way of example, the inspector needs to partially visually recognize only the inspection image in the emergency time while needing to continuously visually recognize the inspection image in a predetermined time including the inspection image in the normal time and the inspection image in the emergency time. However, the gas leakage detector disclosed in PTL 1 does not have a configuration satisfying such necessity.

Figure 8:
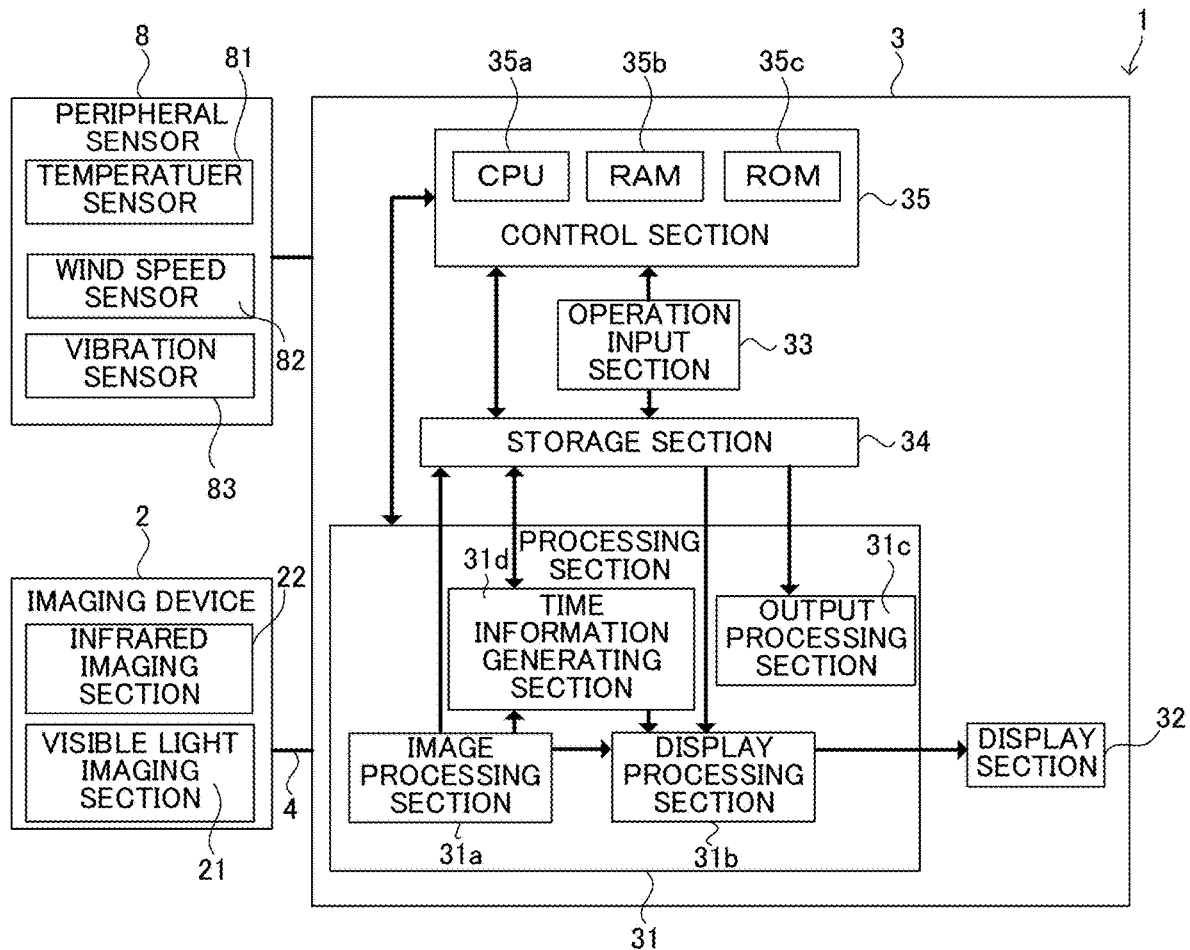
FIG. 8 is a block diagram illustrating an exemplary configuration of a gas detection device according to one or more embodiments.

FIG. 8 is a block diagram of gas detection device 1 according to one or more embodiments. Gas detection device 1, for example, images an inspection region including an inspection target (e.g., a plant) in gas production facility. Then, gas detection device 1 performs image processing to detect a gas on the imaged data.

<Gas Detection Device>

As illustrated in FIG. 8, gas detection device 1 according to one or more embodiments of the present invention includes imaging device 2 and gas detection device body 3. Hereinafter, the configuration that is different from imaging device 2 and gas detection device body 3 included in gas detection device 1 according to the above embodiments will be mainly described. The same reference signs are used for the same configurations, and thus, a description thereof is omitted.

The infrared sensor used for a second optical system of imaging device 2 is, for example, a quantum indium antimonide (INSb) image sensor, a heat-type thermopile array sensor, or a microbolometer, and receives infrared light to generate infrared image data. Infrared imaging section 22 having such a configuration images an inspection region including an inspection target (e.g., plant 6a in FIG. 9A) and sequentially outputs infrared image data to processing section 31 (specifically, image processing section 31a).

<Gas Detection Device Body>

Gas detection device body 3 includes, for example, processing section 31, display section 32, operation input section 33, storage section 34, and control section 35.

<Processing Section>

Processing section 31 comprises at least one dedicated hardware (an electronic circuit) in accordance with a various kind of processing, such as a Digital Signal Processor (DSP), an Application Specific Integrated Circuit (ASIC), or a Programmable Logic Device (PLD).

Processing section 31 includes, as functional blocks, image processing section 31a, display processing section 31b, and output processing section 31c, and time information generating section 31d. Each function of processing section 31 to be described below is realized under the control of control section 35.

<Image Processing Section>

Hereinafter, a function of image processing section 31a will be described.

Image processing section 31a receives infrared image data in the inspection region from infrared imaging section 22.

Image processing section 31a performs a predetermined image processing on the infrared image data in the inspection region to detect a part having a gas.

Image processing section 31a, for example, detects a part having a gas from the infrared image data and generates gas image data by visualizing the detected part. A well-known method can be used for detecting the part having a gas. Image processing section 31a applies a specific color (red or the like) to the part having a gas of the infrared image data. Image processing section 31a corresponds to "gas detection section."

Image processing section 31a receives visible image data from visible light imaging section 21. Image processing section 31a, then, generates inspection image data in which the visible image data is combined with the gas image data. Image processing section 31a also generates temperature image data from the infrared image data. Image processing section 31a may generate inspection image data in which the infrared image data is combined with the gas image data.

Image processing section 31a outputs the inspection image data to image processing section 31b and storage section 34. Storage section 34 stores the inspection image data in association with a time of imaging of the infrared image data to be the basis of the inspection image data. More specifically, storage section 34 stores the inspection image data in association with detection time information indicating the time when a gas is detected by image processing section 31a. Detection time information will be described below in detail.

Figure 9A:
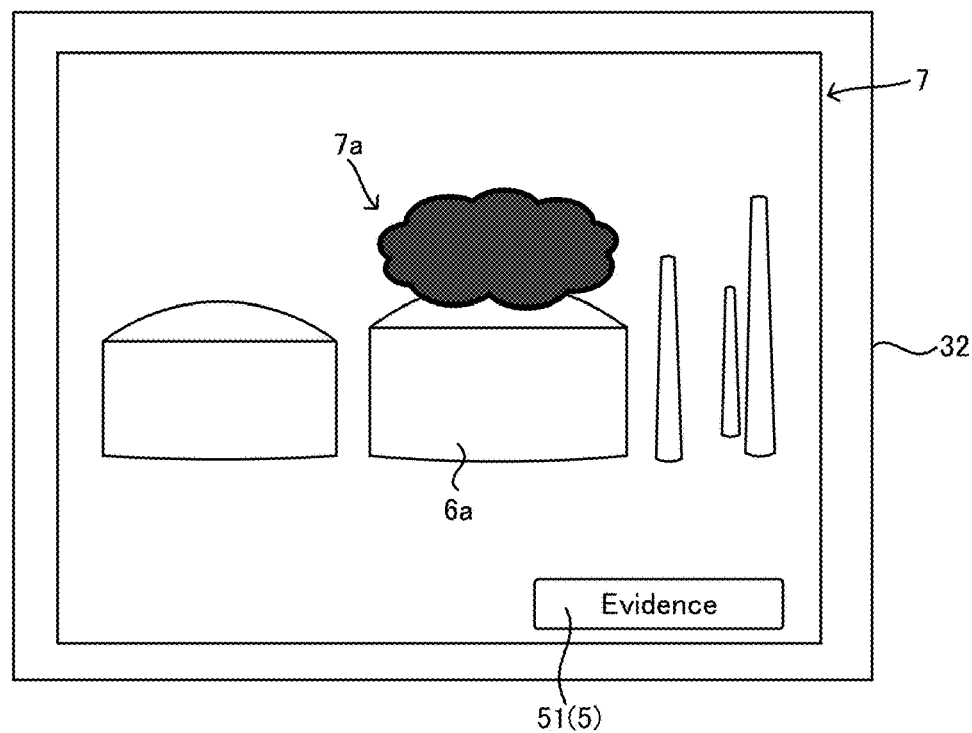
FIG. 9A illustrates an exemplary inspection image displayed on a display section during imaging.

Inspection image data is displayed on display section 32 as inspection image 7 (see FIG. 9A). Gas image 7a (see FIG. 9A) illustrating the gas in inspection image 7 is colored in the specific color.

<Display Processing Section>

Hereinafter, a function of display processing section 31b will be described. The function of display processing section 31b is realized under the control of control section 35. Display processing section 31b having such a configuration controls display of display section 32 to be described below.

Display processing section 31b displays an imaging information input image (not illustrated) for inputting imaging information on display section 32. The imaging information includes various pieces of information required to start imaging by imaging device 2. By way of example, the imaging information includes; customer Identification (ID), user ID, inspector (Name), inspector (Company/Dept), inspection date, inspection type, site name, facility name, facility ID, latitude and longitude of the facility positioned by Global Positioning System (GPS), and/or the like. Image data to be the basis of the imaging information input image is prestored in storage section 34.

Display processing section 31*b* converts the inspection image data received from image processing section 31*a* into a display signal corresponding to display section 32, and outputs the display signal to display inspection image 7 (see FIG. 9A) on display section 32.

Display processing section 31*b* displays supplementary information input image 5 (see FIG. 9A) for inputting supplementary information related to inspection image 7 on display section 32 with inspection image 7. The supplementary information includes information related to importance of and a comment on inspection image 7 displayed on display section 32. The information related to importance includes, for example, the terms "important", "normal", or "unnecessary". The comment includes, for example, comment related to a gas leak, such as "Gas leak is occurring".

FIG. 9A illustrates examples of inspection image 7 and supplementary information input image 5 displayed on display section 32. Information input image 5 is, for example, an icon. Image data to be the basis of supplementary information input image 5 is prestored in storage section 34. Supplementary information input image 5 may be comprised of a plurality of images to be sequentially pop-up displayed respectively for input items corresponding to touch operations by a user.

Figure 9B:
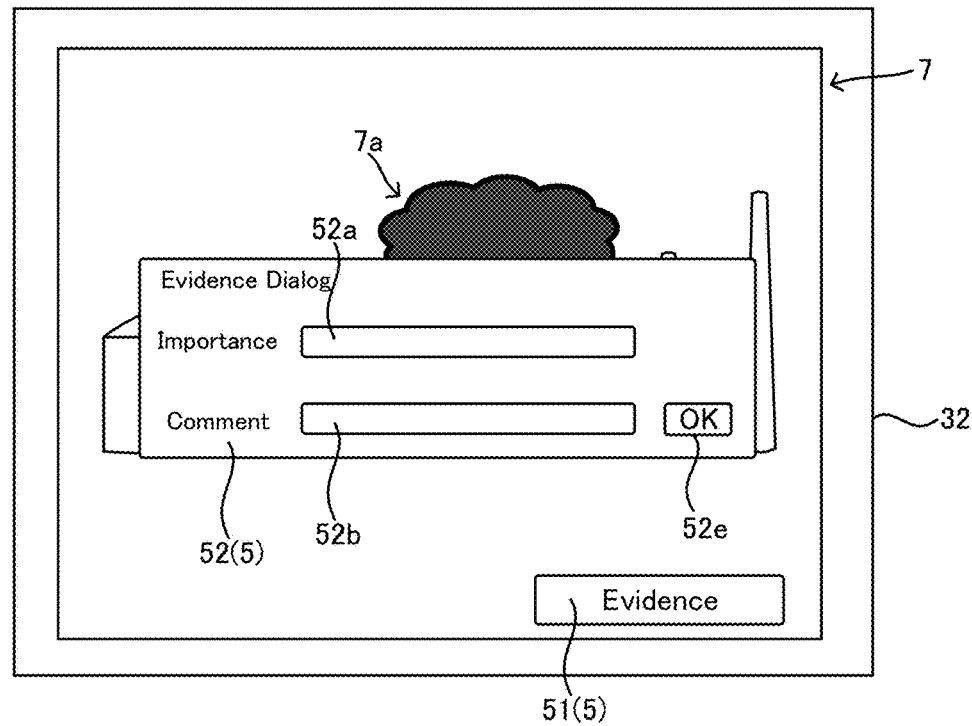
FIG. 9B illustrates an exemplary inspection image on the display section being changed from the state illustrated in FIG. 9A.

In one or more embodiments, supplementary information input image 5 is comprised of first input image 51 (see FIG. 9A) always displayed on display section 32 with inspection image 7, and second input image 52 (see FIG. 9B) displayed on display section 32 when the user operates (e.g., by touch operation) first input image 51.

Figure 10A:
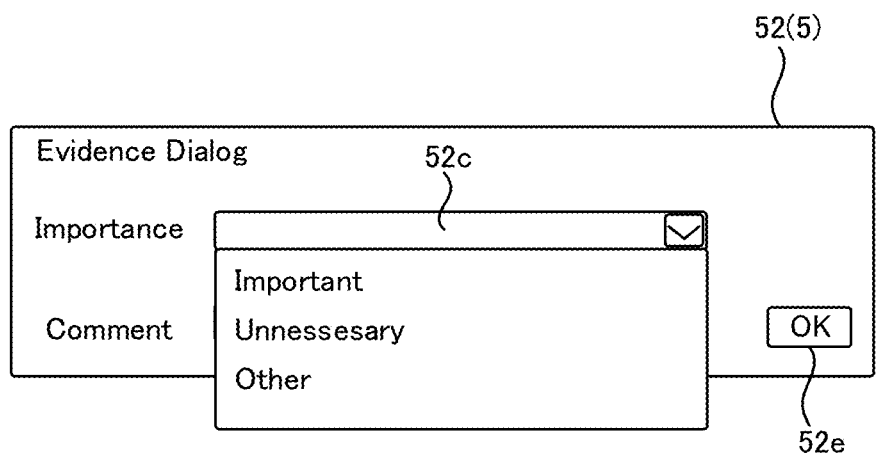
FIG. 10A illustrates the modified example of the second input screen.
Figure 10B:
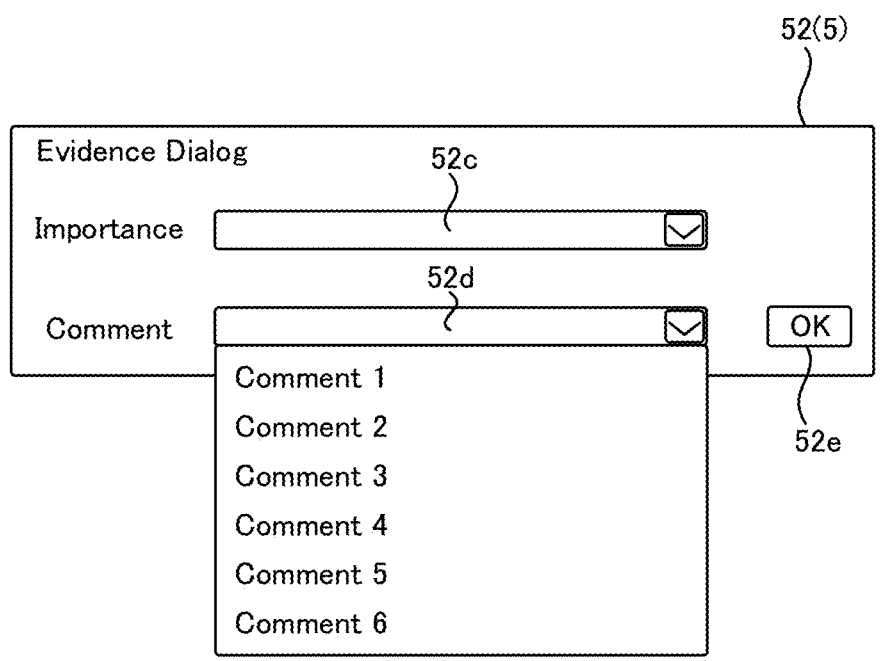
FIG. 10B illustrates the modified example of the second input screen in different states from FIG. 10A.

Display processing section 31*b* displays second input image 52 on display section 32 when first input image 51 is operated by the user. Second input image 52 includes importance input section 52*a* and comment input section 52*b*. The user can optionally input information related to importance of inspection image 7 displayed on display section 32 to importance input section 52*a*. Furthermore, the user can input a comment related to inspection image 7 displayed on display section 32 to comment input section 52*b*. Note that, importance input section 52*a* may be an input section in which input items selectively displayed in a pull-down system, such as importance input section 52*c* illustrated in FIG. 10A. Comment input section 52*b* may be an input section in which input items selectively displayed in a pull-down system, such as importance input section 52*d* illustrated in FIG. 10B.

The time when first input image 51 is operated is stored in storage section 34 in association with the image that is imaged by imaging device 2 and time information of inspection image 7. The supplementary information may be stored during reproduction as well as during recording.

In a case where OK button 52*e* is pressed via operation input section 33 while second input image 52 is displayed on display section 32, display processing section 31*b* deletes second input image 52 from display section 32. Display processing section 31*b* may delete second input image 52 after a predetermined time passes from the start of pop-up display of second input image 52.

When an instruction for reproduction start (hereinafter referred to as "reproduction start instruction") is input via operation input section 33, display processing section 31*b* converts the inspection image data stored in storage section 34 into a display signal corresponding to display section 32, and outputs the display signal to display inspection image 7 on display section 32. In this case, display processing section 31*b* displays supplementary information input image 5 with inspection image 7 on display section 32.

<Output Processing Section>

Output processing section 31*c* generates output information including the inspection image data under the control of control section 35. Output processing section 31*c* generates output information when an output instruction is input from operation input section 33.

Output processing section 31*c* outputs the output information to, for example, an output device such as printer. The output device may be connected to detection device body 3 by a wired or wireless connection. The output device also may be connected to detection device body 3 via a network such as the Internet. Output processing section 31*c* may output the output information to a portable storage medium, such as an optical disk, a magneto-optical disk, or a memory card.

Note that, when gas detection device 1 is connected to a server via a network, output processing section 31*c* may output the output information to the server.

<Control Section>

Control section 35 includes Central Processing Unit (CPU) 35*a* as a calculation/control device, Random Access Memory (RAM) 35*b* and Read Only Memory (ROM) 35*c* as a main storage device. ROM 35*c* stores basic programs and basic setting data. CPU 35*a* reads out programs corresponding to processing contents from ROM 35*c* or storage section 34, loads the programs into RAM 35*b*, and performs centralized control of operations of the respective blocks of gas detection device 1 by executing the loaded programs. Control section 35 having such a configuration controls imaging device 2, display section 32, operation input section 33, and storage section 34 depending on their functions and thereby controls the entire gas detection device 1.

In one or more embodiments, functions of each functional block can be realized by the cooperation of each hardware constituting the functional blocks and control section 35. Note that, a part or all of the functions of each functional block may be realized by execution of the programs by control section 35.

Control section 35 determines reliability of the gas detection based on signals from temperature sensor 81, wind speed sensor 82 and peripheral sensor 8 of vibration sensor 83. Temperature sensor 81 measures an ambient temperature around gas detection device 1. Wind speed sensor 82 measures wind speed around gas detection device 1 or the inspection target. The wind speed can be obtained as wind speed information around the imaging spot using a network. Vibration sensor 83 measures a vibration state of imaging device 2. Control section 35 determines the reliability of the gas detection is low in cases where: a difference in temperature between the temperature indicated by the inspection image of the inspection region imaged by infrared imaging section 22 and the temperature indicated by temperature sensor 81 is lower than or equal to a predetermined temperature; a wind speed indicated by wind speed sensor 82 is greater than or equal to a predetermined value; and a value indicated by vibration sensor 83 is greater than or equal to a predetermined value. Control section 35, then, determines the gas detection information obtained by the image processing in this time slot is invalid in these cases. Control section 35 stores in storage section 34 the time information of inspection image 7 and the invalid information in association with each other.

<Storage Section>

Storage section 34 is, for example, an auxiliary storage device such as a nonvolatile semiconductor memory (a so-called flash memory) or a hard disk drive. Storage section 34 may be a disk drive for reading and writing information by driving an optical disk such as a Compact Disc (CD) or a Digital Versatile Disc (DVD), or a Magneto-Optical Disk (MO). In addition, for example, storage section 34 may be a memory card such as a USB memory or an SD card.

Storage section 34 stores the imaging information input from operation input section 33. Writing of data into storage section 34 and reading of data from storage section 34 are controlled by control section 35.

Storage section 34 stores the inspection image data received from image processing section 31a. Storage section 34 stores the inspection image data in association with the imaging information. Storage section 34 stores the inspection image data in association with the detection time information indicating the time when a gas is detected by image processing section 31a.

Storage section 34 may store the infrared image data after image processing received from image processing section 31a. Storage section 34 may store the infrared image data after image processing in association with the imaging information. Storage section 34 may store the infrared image data after image processing in association with the detection time information.

Storage section 34 may store the infrared image data before image processing generated by infrared imaging section 22. Storage section 34 may store the infrared image data before image processing in association with the imaging information. Storage section 34 may store the infrared image data before image processing in association with the detection time information.

Storage section 34 may store the visible image data generated by visible light imaging section 21. Storage section 34 may store the visible image data in association with the imaging information. Storage section 34 may store the visible image data in association with the detection time information.

Storage section 34 may store the temperature image data. Storage section 34 may store the temperature image data in association with the detection time information.

Storage section 34 stores various pieces of information input from operation input section 33. In particular, storage section 34 stores the supplementary information input from operation input section 33. Storage section 34 stores the supplementary information in association with inspection image 7 (see FIG. 11A) displayed on display section 32 when the supplementary information is input. When inspection image 7 is a moving image, Storage section 34 stores the supplementary information in association with a frame constituting inspection image 7 displayed on display section 32 when the supplementary information is input. The supplementary information may be stored in association with the infrared image data after image processing, the infrared image data before image processing the visible image data or the temperature image data, individually.

In addition, the information related to the reliability of the gas detection is stored in association with the image data. The information related to the reliability of the gas detection may be stored in association with the infrared image data after image processing, the infrared image data before image processing the visible image data or the temperature image data, individually.

Storage section 34 stores image data related of supplementary information input image 5.

<Display Section>

Display section 32 is, for example, a display of a mobile terminal constituting gas detection device body 3. As the display, a liquid crystal display, an organic EL display, or the like can be used. In one or more embodiments, the display is a flat panel display having a touch panel.

Display section 32 displays various kinds of images based on the display signals from display processing section 31b (see FIG. 8) under the control of control section 35. Specifically, display section 32 displays inspection image 7 for the user to visually detect a gas (see FIG. 9A) and the like.

<Operation Input Section>

Operation input section 33 is an input section that receives, for example, input of imaging information. Operation input section 33 also receives an operation relating to reproduction of the inspection image data and an operation relating to imaging of imaging device 2.

Operation input section 33 receives an output instruction related to imaging. Operation input section 33 may receive, for example, designation of items to be included in the output information, together with the output instruction. The items of the output information include imaging information and any other information (e.g., weather information during imaging).

In one or more embodiments, operation input section 33 comprises a flat panel display with a touch panel that is integrally provided with display section 32. The user can input imaging information, operate imaging device 2, and perform reproducing operations of the inspection image data via operation input section 33.

Operation input section 33 is not limited to a flat display with a touch panel, and may be, for example, an input device such as a keyboard, a mouse, or a microphone instead.

According to gas detection device 1 described above, when a gas is detected in an inspection region, a gas detection report is prepared and submitted to a requester (a client). For preparation of the report, the inspection image data is reproduced to confirm the inspection image. When a reproduction start instruction is input via operation input section 33, display processing section 31b converts the inspection image data read out from storage section 34 into a display signal corresponding to display section 32, and then outputs the display signal to display inspection image 7 (see FIG. 9A) on display section 32. The user (the inspector) identifies specifies, for example, a gas leak spot in the inspection region, gas leak occurrence time, and a situation after occurrence of the gas leak by visually recognizing inspection image 7.

Incidentally, for the user, the importance of an inspection image in a normal time when an inspection target has no gas leak is significantly different from that of an inspection image in an emergency time when an inspection target has a gas leak. By way of example, the inspector needs to partially visually recognize only the inspection image in the emergency time while needing to continuously visually recognize the inspection image in a predetermined time including the inspection image in the normal time and the inspection image in the emergency time. That is, the user requires to visually recognize inspection image 7 effectively in accordance with user's own desire.

Thus, in one or more embodiments, when a reproduction start instruction is input, display processing section 31b converts the inspection image data read out from storage section 34 into a display signal corresponding to display section 32, and then outputs the display signal to display inspection image 7 on display section 32. In this case, display processing section 31b displays seek bar image 53 (see FIG. 11A) visualizing a display position on a time axis with inspection image 7 on display section 32.

Figure 11A:
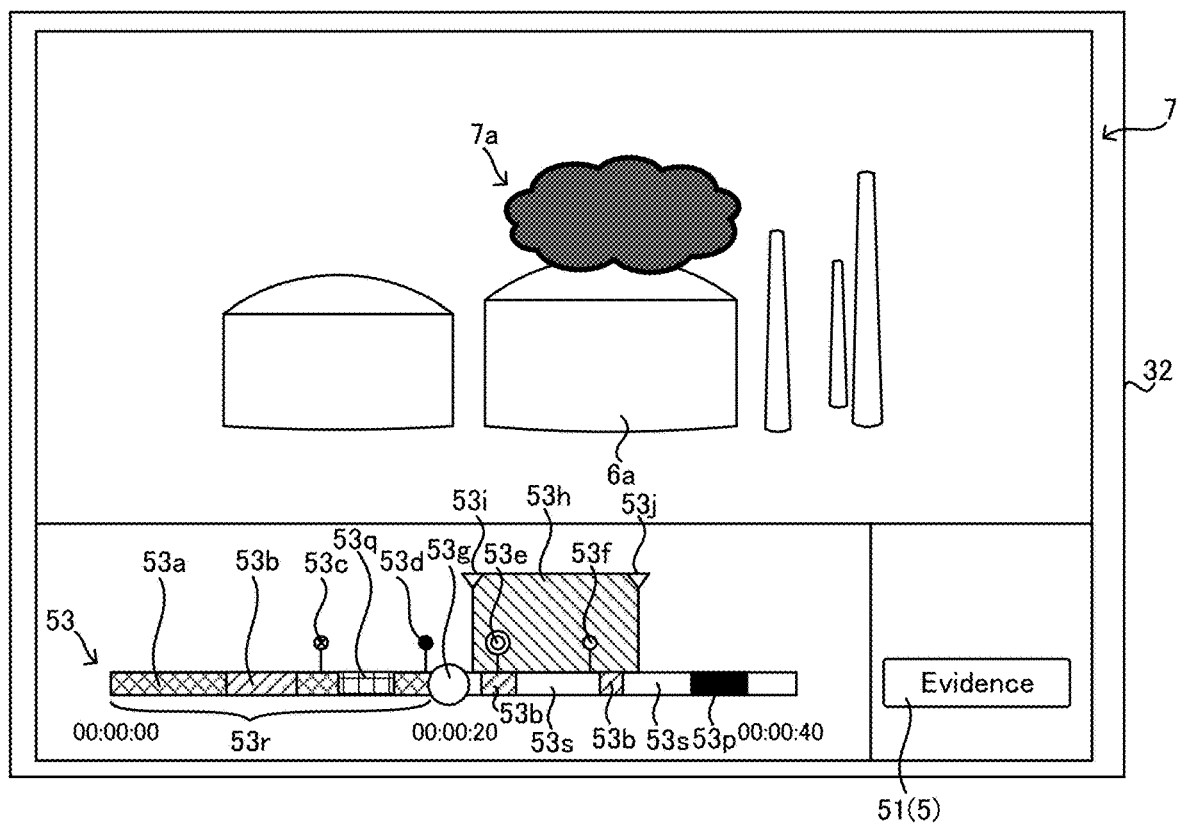
FIG. 11A illustrates an exemplary inspection image displayed on a display section during reproduction.
Figure 11B:
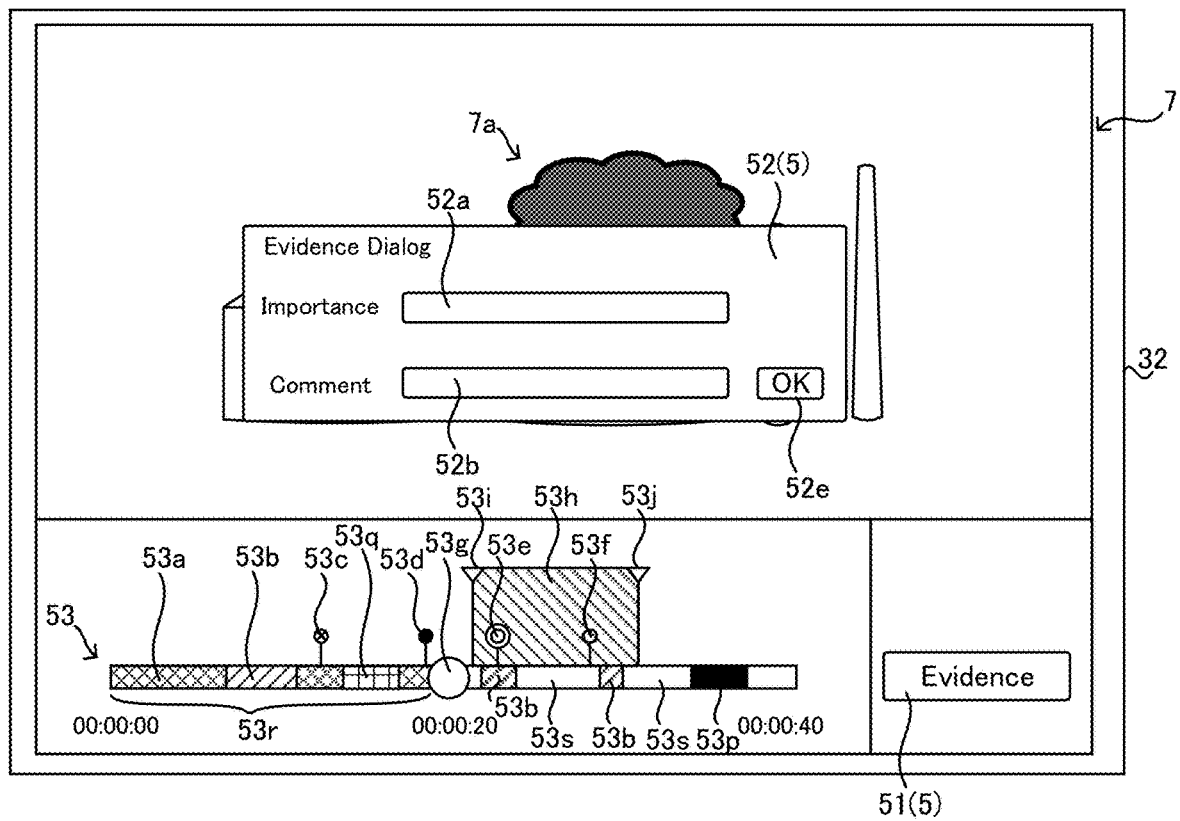
FIG. 11B illustrates an exemplary inspection image on the display section being changed from the state illustrated in FIG. 11A.

Image data to be the basis of seek bar image 53 is prestored in storage section 34. In FIGS. 11A and 11B, as components of seek bar image 53, first bar element 53a, second bar element 53b, third bar element 53p, fourth bar element 53q, fifth bar element 53r, and sixth bar element 53s. First bar element 53a means time when no gas is detected. Second bar element 53b means time when a gas is detected by image processing section 31a. Third bar element 53p means a part where inspection image data are absent or deleted. Fourth bar element 53q means an invalid part of the inspection image data. Fifth bar element 53r means a reproduced part of inspection image 7. Sixth bar element 53s means an unreproduced part of inspection image 7. Note that, second bar element 53b corresponds to "detection time information."

Hereinafter, a function of time information generating section 31d will be described. The function of time information generating section 31d is realized under the control of control section 35.

Time information generating section 31d generates image data to be the basis of first bar element 53a and second bar element 53b based on the time when the infrared image data to be the basis of the inspection image data is imaged. Time information generating section 31d generates image data to be the basis of fourth bar element 53q based on the reliability information stored in storage section 34.

Time information generating section 31d generates fifth bar element 53r and sixth bar element 53s according to the reproduced part of inspection image 7.

Display processing section 31b displays first bar element 53a, second bar element 53b, third bar element 53p, fourth bar element 53q, fifth bar element 53r, and sixth bar element 53s on display section 32, being reflected in seek bar image 53.

Another element to be displayed, being reflected in seek bar image 53 will be described with reference to FIGS. 11A and 11B. In the following description, each mark of first mark 53c to fourth mark 53f is referred to as evidence mark. The evidence mark is displayed on seek bar image 53. A position where the evidence mark is displayed indicates time (reception time information) when input of the supplementary information is received. The evidence mark is a part indicating the supplementary information added by the user.

Display processing section 31b emphatically displays (for example, display in bold or highlighted) third mark 53e, which is located on after reproducing position mark 53g (see FIG. 11A, also referred to as a "slider") indicating a position where the inspection image is reproduced, and which is the nearest mark from reproducing position mark 53g. In a case where third mark 53e is emphatically displayed, time information generating section 31d generates selection range information 53h indicating the time slot selected in accordance with third mark 53e.

Specifically, time information generating section 31d generates, as selection range information 53h, a certain time (a time slot) starting from a position prior to and apart from third mark 53e by a predetermined time to a position later than and apart from third mark 53e by a predetermined time.

In FIGS. 11A and 11B, fifth mark 53i means a front of selection range information 53h. Sixth mark 53j means a rear of selection range information 53h. The user can optionally change selection range information 53h by moving positions of fifth mark 53i or sixth mark 53j via operation input section 33.

Another element to be displayed, being reflected in seek bar image 53 will be described with reference to FIG. 11A. First mark 53c to be displayed, being reflected in seek bar image 53 means a part to which supplementary information having high importance is added. Second mark 53d means a part to which supplementary information having low importance is added. Third mark 53e and fourth mark 53f mean a part to which other supplementary information is added.

As illustrated in FIGS. 11A and 11B, selection range information 53h includes third mark 53e. In FIGS. 11A and 11B, third mark 53e is selected, and selection range information 53h corresponding to third mark 53e is displayed. When fourth mark 53f is selected, selection range information corresponding to fourth mark 53f (not illustrated) is displayed.

When designation of third mark 53e (or fourth mark 53f) is input from operation section 33, output processing section 31c generates the supplementary information related to third mark 53e (or fourth mark 53f) as output information and outputs the supplementary information to another device. The other device includes: for example, a local folder of a Personal Computer (PC) or a flash memory such as an SD card in a case where gas detection device 1 is connected to a PC via a network, an output device such as a server or a printer in a case where gas detection device 1 is connected to a server via a network, and a portable storage medium such as an optical disk.

When outputting the supplementary information, output processing section 31c reads out the inspection image data associated with third mark 53e (or fourth mark 53f) from storage section 34 and outputs the inspection image data to another device.

Figure 12:
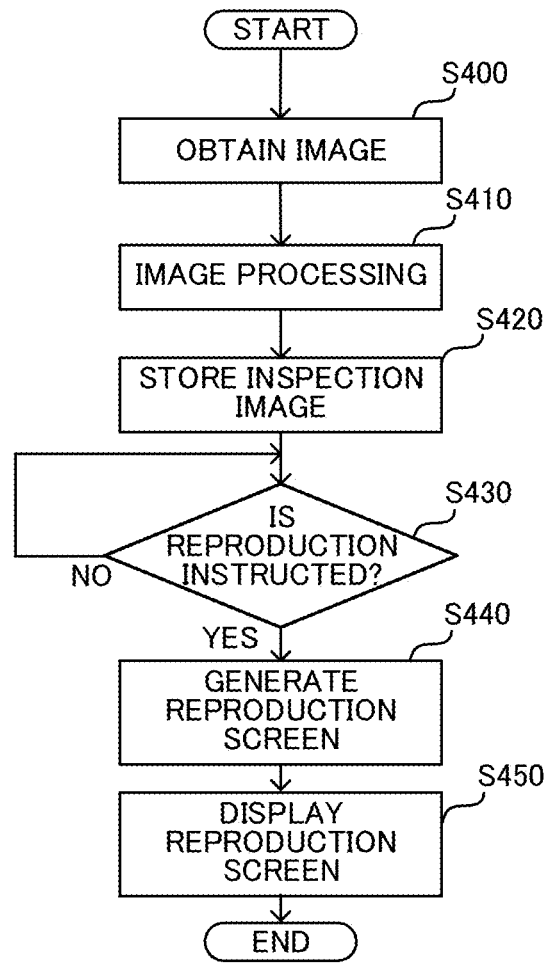
FIG. 12 is a flowchart illustrating an exemplary operation of the gas detection device.

An exemplary operation of gas detection device 1 will be described with reference to FIG. 12. FIG. 12 is a flowchart illustrating an exemplary operation of the gas detection device 1.

Firstly, in step S400 illustrated in FIG. 12, image processing section 31a receives infrared image data from infrared imaging section 22 and receives visible light image data from visible light imaging section 21.

Next, in step S410, image processing section 31a generates an inspection image data based on the infrared image data and the visible light image data.

Next, in step S420, control section 35 stores the inspection image data in storage section 34.

Next, in step S430, control section 35 determines whether an instruction to reproduce inspection image data 7 is input via operation section 33. When the reproduction instruction is input ("YES" in step S430), processing shifts to step S440. When the reproduction instruction is not input ("NO" in step S430), processing returns to the condition before step S430.

Next, in step S440, processing section 31 generates a reproduction screen. Specifically, time information generating section 31d generates the image data of first bar element 53a, second bar element 53b, third bar element 53p, and fourth bar element 53q.

Next, in step S450, display processing section 31b displays the reproduction screen on display section 32. Thus, seek bar image 53 is displayed in the first region of the reproduction screen. Seek bar image 53 is displayed in the second region of the reproduction screen. Supplementary information input image 5 is displayed in the third region of the reproduction screen.

Gas detection device 1 according to the embodiments described above includes: image processing section 31*a* that visualizes a gas in the inspection region by performing the image processing on the infrared image data in the inspection region imaged by infrared imaging section 22; a gas detection section (image processing section 31*a*) that detects the gas based on a result of the image processing; and display processing section 31*b* that displays inspection image 7 reflecting the result of the image processing and displays second bar element 53*b* (detection time information) indicating a time when the gas is detected by image processing section 31*a*. Such gas detection device 1 enables visually recognizing inspection image 7 efficiently based on second bar element 53*b*. As a result, the user can select with ease inspection image 7 corresponding to second bar element 53*b* from among inspection images 7 and submit, to a requester (a client), selected inspection image 7 attaching a report.

In the above embodiments, display processing section 31*b* emphatically displays an evidence mark according to a position of reproducing position mark 53*g* (a slider). For example, when the position of the slider is located in a predetermined time of an evidence mark, display processing section 31*b* emphatically displays the next evidence mark in the same predetermined time. This enables visually recognizing inspection image 7 efficiently based on the importance of the emphatically displayed evidence mark.

In the above embodiments, when any one of first mark 53*c* to fourth mark 53*f* is designated via operation input section 33, display processing section 31*b* may display reproducing position mark 53*g* (the slider) returning to the position corresponding the initial frame of an offset value (e.g., an amount of data in a predetermined few seconds) from the designated mark.

In the above embodiments, when a position other than the slider in seek bar 53 is tapped via operation input section 33, display processing section 31*b* may display the slider, moving the slider to the tapped position. Thus, the reproduction of inspection image 7 is continued from the tapped position. In addition, when the slider is held via operation input section 33, display processing section 31*b* may display the slider, holding the slider in the hold position. Thus, the reproduction of inspection image 7 is stopped when inspection image 7 is being reproduced. Furthermore, when the slider is released via operation input section 33, display processing section 31*b* may display the slider in a released state. Thus, the reproduction of inspection image 7 is resumed.

In the above embodiments, an evidence (supplementary information) having high importance may be set in a higher layer. By contrast, an evidence having low importance or an unnecessary evidence may be set in a lower layer. When the importance is the same among evidences, the more recently updated evidence may be set in a higher layer. When an evidence mark is emphatically displayed, the evidence may be moved to the higher layer so as to be easily selected. Since the position of the layer changes depending on the importance of the evidence, the evidence can be handled easily.

In the above embodiments, time information generating section 31*d* generates selection range information 53*h* such that fourth bar element 53*q* that means an invalid part of the inspection image data is not included in selection range information 53*h*.

In the above embodiments, display processing section 31*b* may display second bar element 53*b* indicating a time when a gas is detected, while changing the depth of a color according to an amount of leaked gas. This enables the user to recognize the degree of risk. Display processing section 31*b* may display second bar element 53*b* more emphatically when the amount of leaked gas exceeds a predetermined amount. In this case, display processing section 31*b*, for example, may display a screen of inspection image 7 so as to surround the screen of inspection image 7 by a red frame.

In the above embodiments, display processing section 31*b* may display seek bar image 53, while reflecting thereon a mark indicating a separation position for every predetermined time of data.

In the above embodiments, display processing section 31*b* displays seek bar image 53 during reproduction of inspection image 7; however, seek bar image 53 is not limited to this and may be displayed during imaging.

In the above embodiments, display processing section 31*b* displays seek bar image 53 corresponding to inspection image 7; however, seek bar image 53 may be displayed corresponding to infrared image data after image processing, infrared image data before image processing, visible image, or temperature image.

Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

REFERENCE SIGNS LIST

1 Gas detection device
2 Imaging device
3 Gas detection device body
4 Cable
5 Supplementary information input image
6*a* Plant
7 Inspection image
7*a* Gas image
21 Visible light imaging section
22 Infrared imaging section
31 Processing section
31*a* Image processing section
31*b* Display processing section
31*c* Output processing section
31*d* Time information generating section
32 Display section
33 Operation input section
34 Storage section
35 Control section
53 Seek bar image
53*a* First bar element
53*b* Second bar element
53*c* First mark
53*d* Second mark
53*e* Third mark
53*f* Fourth mark
53*g* Reproducing position mark
53*h* Selection range information

The invention claimed is:
1. A gas detection device, comprising:
an input interface that receives an input of supplementary information on an inspection image;

a processor that:
  visualizes a gas by performing image processing on infrared image data in an inspection region imaged by an imaging device;
  detects the gas based on a result of the image processing; and
  displays:
    the inspection image reflecting the result of the image processing;
    detection time information indicating a detection time of the gas;
    reception time information indicating a time when the input of the supplementary information is received by the input interface; and
    a seek bar that has a time axis and shows the detection time information along the time axis, wherein
    the seek bar further shows a first time slot during which reliability of gas detection is determined by the processor to be low.

2. The gas detection device according to claim 1, wherein the processor displays the inspection image and the detection time information in accordance with an instruction of a user.

3. The gas detection device according to claim 1, wherein the seek bar further shows the reception time information.

4. The gas detection device according to claim 1, wherein the processor outputs the supplementary information to an output device.

5. The gas detection device according to claim 4, wherein the processor outputs inspection image data in selection range information indicating a selected time slot in accordance with the reception time information.

6. The gas detection device according to claim 5, wherein the processor outputs the inspection image data in the selection range information together with the supplementary information on the reception time information.

7. The gas detection device according to claim 1, wherein the processor determines the reliability of the gas detection based on signals from at least one of a temperature sensor, a wind speed sensor, and a vibration sensor.

8. The gas detection device according to claim 1, wherein the seek bar further shows a second time slot during which a gas is detected, while changing a depth of a color of the second time slot according to an amount of leaked gas.

9. The gas detection device according to claim 1, wherein the seek bar further shows, in addition to the first time slot, a second time slot during which a gas is detected and a third time slot during which no gas is detected such that the first, second, and third time slots can be identified.

10. A gas detection method, comprising:
  receiving an input of supplementary information on an inspection image;
  visualizing a gas by performing image processing on infrared image data in an inspection region imaged by an imaging device;
  detecting the gas based on a result of the image processing; and
  displaying:
    the inspection image reflecting the result of the image processing;
    detection time information indicating a detection time of the gas;
    reception time information indicating a time when the input of the supplementary information is received; and
    a seek bar that has a time axis and shows the detection time information along the time axis, wherein
    the seek bar further shows a first time slot during which reliability of gas detection is determined to be low.

11. A non-transitory computer-readable recording medium storing an instruction for a gas detection device, the instruction causing the gas detection device to execute:
  receiving an input of supplementary information on an inspection image;
  visualizing a gas by performing image processing on infrared image data in an inspection region imaged by an imaging device;
  detecting the gas based on a result of the image processing; and
  displaying:
    the inspection image reflecting the result of the image processing;
    detection time information indicating a detection time of the gas;
    reception time information indicating a time when the input of the supplementary information is received; and
    a seek bar that has a time axis and shows the detection time information along the time axis, wherein
    the seek bar further shows a first time slot during which reliability of gas detection is determined to be low.

* * * * *